United States Patent
Osaki et al.

(10) Patent No.: US 8,396,968 B2
(45) Date of Patent: Mar. 12, 2013

(54) INFORMATION PROCESSOR AND RESOURCE SCHEDULING METHOD

(75) Inventors: Hiroyuki Osaki, Sagamihara (JP); Yoko Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 379 days.

(21) Appl. No.: 12/869,208

(22) Filed: Aug. 26, 2010

(65) Prior Publication Data

US 2011/0145415 A1    Jun. 16, 2011

(30) Foreign Application Priority Data

Dec. 14, 2009    (JP) .................................. 2009-282987

(51) Int. Cl.
G06F 15/16    (2006.01)
(52) U.S. Cl. ......... 709/226; 709/203; 709/219; 709/227
(58) Field of Classification Search .................. 709/203, 709/219, 226, 227
See application file for complete search history.

(56) References Cited

U.S. PATENT DOCUMENTS

| | | | | |
|---|---|---|---|---|
| 5,369,570 A | * | 11/1994 | Parad | 709/226 |
| 2010/0088126 A1 | * | 4/2010 | Iaia et al. | 709/226 |
| 2010/0332661 A1 | * | 12/2010 | Tameshige | 709/226 |

FOREIGN PATENT DOCUMENTS

JP    2008-217302    9/2008

* cited by examiner

*Primary Examiner* — Phuoc Nguyen
(74) *Attorney, Agent, or Firm* — Foley & Lardner LLP

(57) ABSTRACT

The information processor is provided with a receiving unit that receives a request including a period in which the resource is used, a usage status and a cession requirement, a work process storage that stores a pre-cession usage status, a post-cession usage status and a calculating condition, a work time arithmetic expression storage that stores an arithmetic expression of work time, a concession plan preparing unit that determines whether or not it is written to a cession requirement, calculates work time based upon the calculating condition and a specified post-cession usage status and an arithmetic expression, and calculates the capacity of the available resource with which the concession destination user is conceded based upon the calculated work time, the usage period included in the request and the usage period included in the request, and a concession managing unit that makes the resource of the capacity calculated.

20 Claims, 21 Drawing Sheets

FIRST EMBODIMENT: WHOLE BLOCK DIAGRAM

FIG.2

RESERVATION REQUEST

| RESERVATION REQUEST NUMBER (201) | USER NAME (202) | START TIME (203) | PERIOD (204) | USAGE STATUS (205) | RESOURCE CAPACITY (206) | AUTHORITY CESSION REQUIREMENT (207) |
|---|---|---|---|---|---|---|
| 1 | User1 | 2009/xx/xx | 10days | VIRTUAL SERVER | "NUMBER:1 CPU ACTIVITY RATIO:50% MEMORY ACTIVITY RATIO:1GB" | "WHETHER CONCESSION IS POSSIBLE OR NOT=YES RESTART TIME= 2009/yy/yy" |

AUTHORITY CESSION REQUIREMENT LIST

| AUTHORITY CESSION REQUIREMENT ID (301) | USER NAME (302) | START TIME (303) | PERIOD (304) | USAGE STATUS (305) | RESOURCE CAPACITY (306) | AUTHORITY CESSION REQUIREMENT (307) | RESERVED RESOURCE NAME (308) |
|---|---|---|---|---|---|---|---|
| 1 | User1 | 2009/xx/xx | 10days | VIRTUAL SERVER | "NUMBER:1 CPU ACTIVITY RATIO:50% MEMORY ACTIVITY RATIO:1GB" | "WHETHER CONCESSION IS POSSIBLE OR NOT=YES RESTART TIME= 2009/yy/yy" | SERVER A1 |
| 2 | User5 | 2009/xx/xx | 20days | PHYSICAL SERVER | ... | ... | SERVER A2 |

AUTHORITY CESSION REQUEST LIST

| AUTHORITY CESSION REQUEST ID | USER NAME | START TIME | PERIOD | USAGE STATUS | RESOURCE CAPACITY |
|---|---|---|---|---|---|
| 1 | User2 | 2009/NN/NN | 10days | VIRTUAL SERVER | "NUMBER:1 CPU ACTIVITY RATIO:50% MEMORY ACTIVITY RATIO:1GB" |
| 2 | User4 | 2009/xx/xx | 20days | PHYSICAL SERVER | ... |

FIG. 5

USAGE STATUS CHANGE WORK TIME ARITHMETIC EXPRESSION LIST

| USAGE STATUS CHANGE WORK EXECUTOR | USAGE STATUS CHANGE WORK CONTENTS | USAGE STATUS CHANGE WORK TIME ARITHMETIC EXPRESSION |
|---|---|---|
| VIRTUAL HYPERVISOR | RESERVING CPU SPACE AREA | (REFERENCE VALUE)[1 SEC.] |
| VIRTUAL SERVER | FREEING MEMORY | (REFERENCE VALUE)[2 MIN.]x(MEMORY FREED CAPACITY) |
| | ACTIVATING VIRTUAL SERVER | (REFERENCE VALUE)[5 MIN.]x(CPU USED CAPACITY) |
| | TERMINATING VIRTUAL SERVER | (REFERENCE VALUE)[5 MIN.]x(CPU USED CAPACITY) |
| PHYSICAL SERVER | ACTIVATING PHYSICAL SERVER | (REFERENCE VALUE)[5 MIN.] |
| | TERMINATING PHYSICAL SERVER | (REFERENCE VALUE)[5 MIN.] |
| | ACTIVATING HYPERVISOR | (REFERENCE VALUE)[3 MIN.] |
| MAINTENANCE ENGINEER | BACKUP | (REFERENCE VALUE)[1 HOUR.]x(NUMBER) |
| | CHANGING NETWORK CONNECTION | (REFERENCE VALUE)[20 MIN.]x(NUMBER) |
| | CHANGING LU | (REFERENCE VALUE)[10 MIN.]x(NUMBER) |
| | VIRTUALIZED ENVIRONMENT SETTING 1 | (REFERENCE VALUE)[10 MIN.]x(NUMBER) |
| ... | ... | ... |

FIG. 6

USAGE STATUS CHANGE WORK PROCESS LIST

| CONCESSION PATTERN | | CONDITION | CONCEDING METHOD | |
|---|---|---|---|---|
| PRE-CESSION STAGE STATUS | POST-CESSION USAGE STATUS | | USAGE STATUS CHANGE WORK EXECUTOR | USAGE STATUS CHANGE WORK CONTENTS |
| VIRTUAL SERVER | VIRTUAL SERVER | CPU ACTIVITY RATIO OF RESERVED RESOURCE CAPACITY IS BELOW CPU ACTIVITY RATIO OF CONCESSION DESTINATION RESOURCE CAPACITY (RESERVED RESOURCE CAPACITY(CPU ACTIVITY RATIO)≦CONCESSION DESTINATION RESOURCE CAPACITY (CPU ACTIVITY RATIO)) | VIRTUAL HYPERVISOR | RESERVING CPU SPACE AREA |
| | | MEMORY USED CAPACITY OF RESERVED RESOURCE CAPACITY IS BELOW MEMORY USED CAPACITY OF CONCESSION DESTINATION RESOURCE CAPACITY (RESERVED RESOURCE CAPACITY(MEMORY ACTIVITY RATIO)≦CONCESSION DESTINATION RESOURCE CAPACITY (MEMORY ACTIVITY RATIO)) | VIRTUAL SERVER | FREEING MEMORY (MEMORY FREED USED CAPACITY=MEMORY USED CAPACITY OF CONCESSION DESTINATION RESOURCE CAPACITY-MEMORY USED CAPACITY OF RESERVED RESOURCE CAPACITY) |
| | | DEFAULT | VIRTUAL SERVER | ACTIVATING VIRTUAL SERVER |
| PHYSICAL SERVER | PHYSICAL SERVER | - | PHYSICAL SERVER | TERMINATING PHYSICAL SERVER |
| | | | MAINTENANCE ENGINEER | CHANGING LU |
| | | | PHYSICAL SERVER | ACTIVATING PHYSICAL SERVER |
| VIRTUAL SERVER | PHYSICAL SERVER | - | VIRTUAL SERVER | TERMINATING VIRTUAL SERVER |
| | | | PHYSICAL SERVER | TERMINATING PHYSICAL SERVER |
| | | | MAINTENANCE ENGINEER | CHANGING LU |
| | | | PHYSICAL SERVER | ACTIVATING PHYSICAL MACHINE |
| PHYSICAL SERVER | VIRTUAL SERVER | - | PHYSICAL SERVER | TERMINATING PHYSICAL SERVER |
| ... | | | | ... |

FIG.7

RESOURCE LIST

| RESOURCE CLASS | RESOURCE NAME | RESERVED START TIME | RESERVED PERIOD |
|---|---|---|---|
| ClassA | SARVER A1 | 2009/xx/xx | 20days |
| | | 2009/xx/xx | 30days |
| | SARVER A2 | 2009/xx/xx | 10days |
| ClassB | SARVER B1 | 2009/XX/XX | 20days |
| | | 2009/XX/XX | 10days |
| | SARVER B2 | 2009/XX/XX | 30days |
| ClassC | SARVER C1 | 2009/xx/xx | 5days |
| | SARVER C2 | - | - |
| | SARVER C2 | 2009/xx/xx | 15days |

AUTHORITY RESERVATION LIST

| AUTHORITY RESERVATION LIST ID | RESERVED USER NAME | RESERVED START TIME | RESERVED PERIOD | RESERVED RESOURCE NAME | USAGE STATUS | RESERVED RESOURCE CAPACITY | AUTHORITY CESSION REQUIREMENT |
|---|---|---|---|---|---|---|---|
| 1 | User1 | 2009/xx/xx | 10days | SERVER A1 | VIRTUAL SERVER | "NUMBER:1 CPU ACTIVITY RATIO:50% MEMORY USED CAPACITY:1GB" | "WHETHER CONCESSION IS POSSIBLE OR NOT=YES RESTART TIME= 2009/yy/yy" |
| 2 | User3 | 2009/XX/XX | 30days | SERVER A2 | PHYSICAL SERVER | "NUMBER:1" | "WHETHER CONCESSION IS POSSIBLE OR NOT=NO" |

CONCESSION PLAN PREPARATION START FLAG

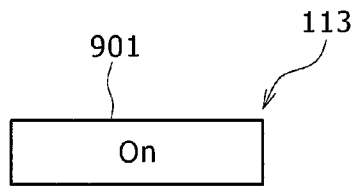

FIG.10

CONCESSION SOURCE/CONCESSION DESTINATION CANDIDATE LIST

| 1001 | 1002 | 1003 | 1004 | 1005 | 1006 | 1007 | 1008 | 1009 |
|---|---|---|---|---|---|---|---|---|
| CONCESSION DESTINATION USER NAME | CONCESSION DESTINATION USAGE STATUS | CONCESSION DESTINATION RESOURCE CAPACITY | RESERVED RESOURCE CAPACITY | CONCESSION SOURCE USER NAME | CONCESSION SOURCE USAGE STATUS | CONCESSION SOURCE RESOURCE CAPACITY | CONCEDING METHOD | RESERVED RESOURCE NAME |
| User2 | VIRTUAL SERVER | "NUMBER:1 CPU ACTIVITY RATIO:50% USED CAPACITY :1GB" | "NUMBER:1 CPU ACTIVITY RATIO:50% USED CAPACITY :0.4GB" | User1 | VIRTUAL SERVER | "NUMBER:1 CPU ACTIVITY RATIO:50% MEMORY ACTIVITY RATIO:1GB" | FREEING MEMORY (MEMORY FREED CAPACITY =0.6GB) | SERVER A1 |
| | | | | User11 | VIRTUAL SERVER | "NUMBER:1 CPU ACTIVITY RATIO:50% MEMORY ACTIVITY RATIO:1GB" | - | SERVER A2 |

FIG.11

USAGE STATUS CHANGE WORK CANDIDATE LIST

| USAGE STATUS CHANGE WORK EXECUTOR | USAGE STATUS CHANGE WORK CANDIDATE | USAGE STATUS CHANGE WORK TIME ESTIMATED VALUE | USAGE STATUS CHANGE WORK TARGET RESOURCE NAME |
|---|---|---|---|
| VIRTUAL SERVER | FREEING MEMORY | 1.2 MIN. | SERVER A1 |
| VIRTUAL SERVER | ACTIVETING VIRTUAL SERVER | 5 MIN. | SERVER A1 |
| VIRTUAL SERVER | ACTIVETING VIRTUAL SERVER | 5 MIN. | SERVER A2 |
| VIRTUAL HYPERVISOR | RESERVING CPU SPACE AREA | 0.5 SEC. | SERVER A1 |

FIG.12

AVAILABLE RESOURCE CLASS LIST

| USAGE STATUS | RESOURCE CLASS |
|---|---|
| VIRTUAL SERVER | ClassA, ClassB |
| PHYSICAL SERVER | ClassA, ClassC |

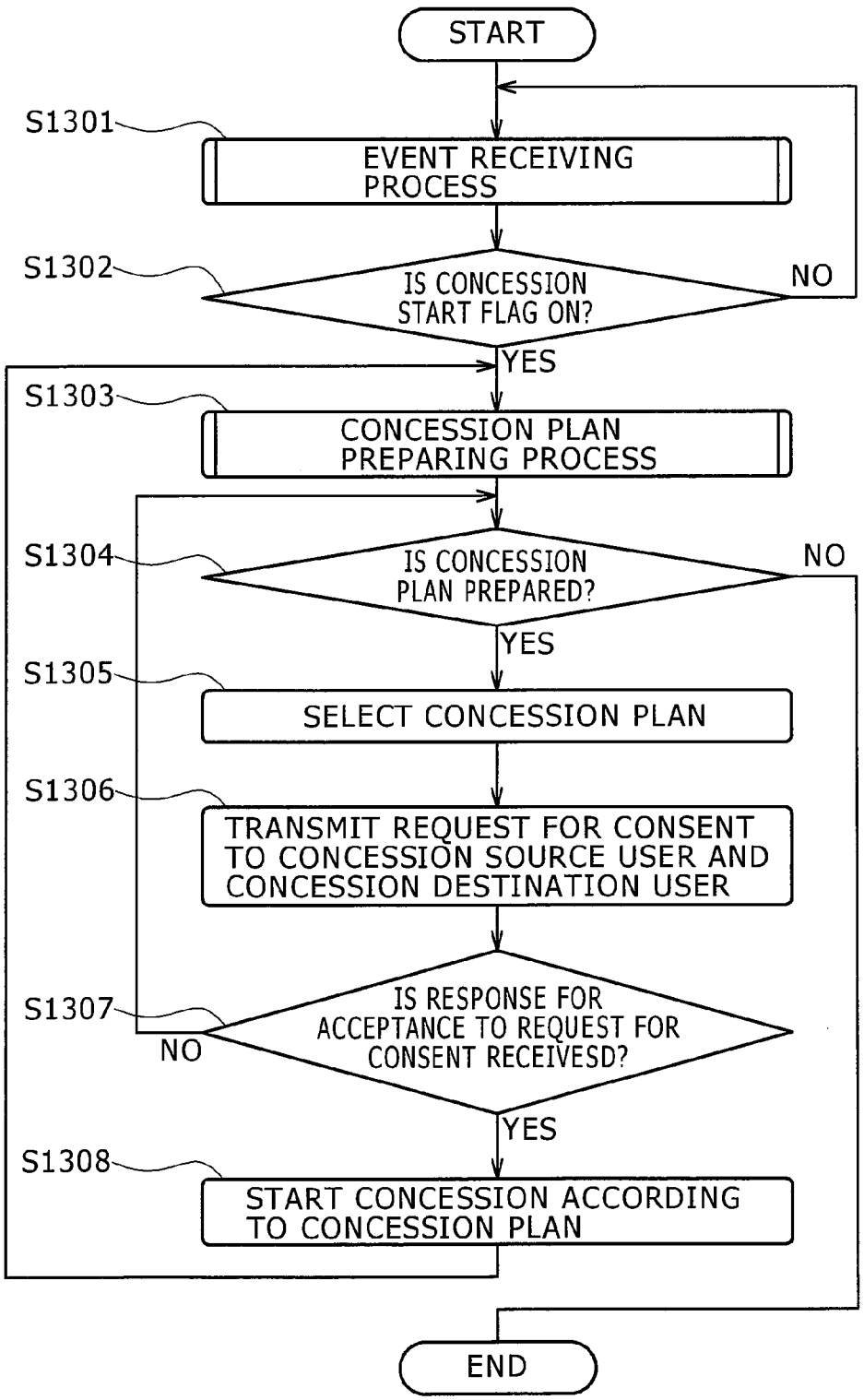

FIG.20

CONCESSION PLAN INFORMATION LIST 2301

| CONCESSION PLAN NUMBER | RESERVATION REQUEST NUMBER | USER NAME | CONCESSION CONTENTS |
|---|---|---|---|
| 1 | 1 | User1 User2 | "TIME:2009/xx/xx CONCESSION SOURCE:User1 CONCESSION DESTINATION:User2 RESTART TIME=2009/yy/yy" |

2302　2303　2304　2305

SECOND EMBODIMENT: WHOLE BLOCK DIAGRAM

FIG.23

USAGE STATUS CHANGE WORK TIME RESULTS INFORMATION

| USAGE STATUS CHANGE WORK EXECUTOR | USAGE STATUS CHANGE WORK CONTENTS | USAGE STATUS CHANGE WORK TIME RESULTANT VALUE |
|---|---|---|
| VIRTUAL SERVER | FREEING MEMORY | 8 MIN. |

FIG.25

THIRD EMBODIMENT:CONCESSION PLAN LIST

| CONCESSION PLAN NUMBER | RESERVATION REQUEST NUMBER | USER NAME | CONCESSION CONTENTS | RESPONSE EXPIRATION DATE |
|---|---|---|---|---|
| 1 | 1 | User1 User2 | "TIME:2009/xx/ww CONCESSION SOURCE:User1 CONCESSION DESTINATION:User2 RESTART TIME=2009/xx/yy" | 2009/xx/zz |

FIG.26

THIRD EMBODIMENT:CONCESSION CONSENT RESPONSE INFORMATION

| CONCESSION PLAN NUMBER | USER NAME | CONCESSION CONSENT |
|---|---|---|
| 1 | User1 | No |

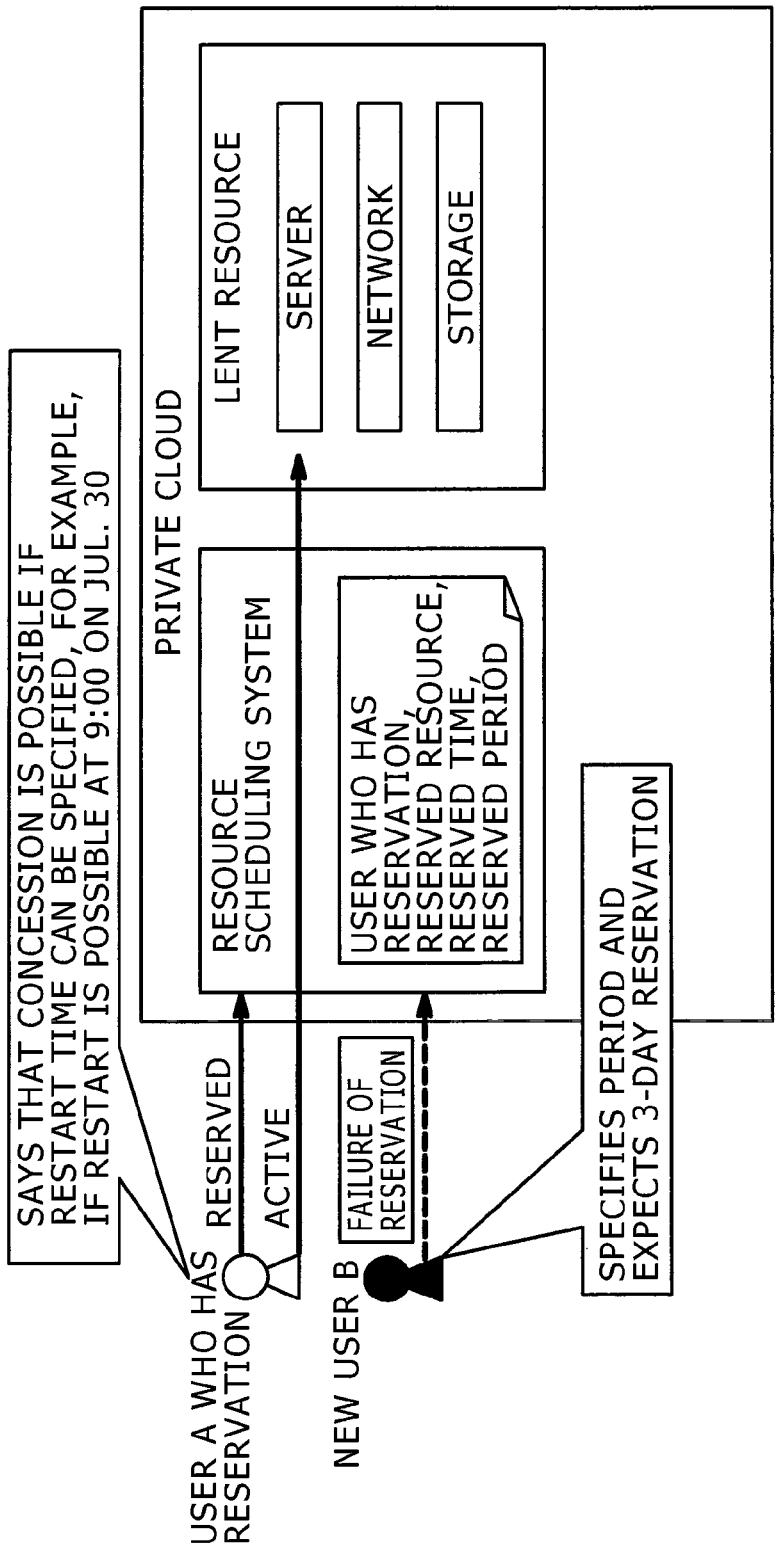

INFORMATION PROCESSOR AND RESOURCE SCHEDULING METHOD

CLAIM OF PRIORITY

The present application claims priority from Japanese application serial no. JP2009-282987, filed on Dec. 14, 2009, the content of which is hereby incorporated by reference into this application.

FIELD OF THE INVENTION

The present invention relates to an information processor that controls resources such as a server and a storage which a computer respectively uses and a resource scheduling method.

BACKGROUND OF THE INVENTION

Generally, when a user uses a system provided with resources such as a server and a disk, these resources are normally occupied by the user. However, depending upon timing, though resources are once occupied, they are not used for a certain period, afterward, may be used again, and the resources are not necessarily ordinarily occupied. Therefore, when another user requests while the resources are not used, it is desirable that the use of the resources is permitted and the resources are efficiently distributed.

Recently, a new computer system called a private cloud attracts a great deal of attention. In the private cloud, information processing that exceeds the performance of resources of an individual computer is enabled by accessing to resources shared in the cloud. As a user can share the resources in the cloud, the whole resources of the computer system are efficiently utilized and its operational cost can be reduced.

Incidentally, for one technology for enhancing a utilization factor of resources, virtualization technology can be mentioned. According to the virtualization technology, various processing can be simultaneously executed as plural logical computers even in one physical computer by configuring a virtual computer inside a computer such as PC. Therefore, in a view from the whole system provided with such plural computers, the number of physical computers can be reduced, a utilization factor of resources of the whole system is enhanced, and the cost can be reduced (for example, refer to JP-A No. 2008-217302).

SUMMARY OF THE INVENTION

According to the private cloud, the more users are, the more a utilization factor of resources of a computer is enhanced. However, when the resources in the private cloud are scheduled to secure more users, the following problem occurs.

That is, heretofore, even if a new user urgently makes a reservation request when resources of all computers in the cloud are used, the reservation request is canceled. FIG. 27 shows a situation in which a conventional type resource scheduling system cancels a reservation request.

A case shown in FIG. 27 that a user A reserves a server already registered as a lent resource so as to utilize the lent resource in a private cloud will be considered. Even if a new user B requests the use of a server for three days of the resource scheduling system in the private cloud when the user A thinks that another user may utilize till 9:00 if only utilization can be restarted at 9:00 on Jul. 30, the reservation request is canceled because the server is already reserved at the time of the reservation by the new user B, and the resource is not efficiently utilized.

In such a case, to more efficiently utilize resources, it is required to shift an adaptable user out of users utilizing resources in the private cloud to an unoccupied time zone, to accept a reservation request from a new user and to concede the new user with the resource. However, when the resource already utilized by the user is once utilized by another user, the utilization of the resource cannot be necessarily restarted in a period in which the concession is permitted.

The reason is that when the resource is a computer, maintenance work such as its reactivation and a change of the allocation of CPU is indefinite in relation with a situation of the utilization of another computer. That is, the reason is that time required for the reservation of CPU and the freeing of a memory is different depending upon whether the resource of the conceded computer is utilized as a physical server or as a virtual server or how much free space of the CPU and the memory of the conceded computer exists.

As described above, when a case that the original user cannot restart the utilization of the computer occurs, the utilization factor of the private cloud decreases and as a result, the resource of the computer cannot be efficiently utilized. Accordingly, to efficiently utilize the resource of the computer in the private cloud, the accurate estimate of the above-mentioned work time is essential.

In JP-A No. 2008-217302, an optimum virtual server for a user is conceded by calculating time required for the conversion of a virtual machine in consideration of a version of a virtual machine monitor (VMM). However, the above-mentioned work time such as a change of the allocation of CPU is not considered and there is a problem that a period in which the concession is permitted cannot be securely guaranteed, that is, a resource cannot be securely conceded.

The present invention is made in view of the above-mentioned and its object is to provide an information processor and a resource scheduling method in which a resource can be securely conceded.

To achieve the object, an information processor according to the present invention is provided with a receiving unit that receives a request at least including a period in which a resource is used, a usage status showing environment in which the resource is used and a cession requirement showing whether or not the concession of the resource from a concession source user to a concession destination user is possible from the concession source user and the concession destination user, a work process storage that stores a pre-cession usage status which is a usage status of the resource of the concession source user, a post-cession usage status which is a usage status of the resource of the concession destination user and a calculating condition for calculating work time required for shifting from the pre-cession usage status to the post-cession usage status with them correlated, a work time arithmetic expression storage that stores an arithmetic expression of the work time with the arithmetic expression correlated with the calculating condition, a concession plan preparing unit that determines whether or not the concession of the resource is written to the cession requirement in the request received from the concession source user, specifies the pre-cession usage status identical with the usage status included in the request received from the concession source user and the post-cession usage status identical with the usage status included in the request received from the concession destination user when the concession plan preparing unit determines that the concession of the resource is written to the cession requirement in the request received from the concession source user, calculates the work time based upon the calculating condition and the arithmetic expression corresponding to the calculating condition respectively corresponding to the specified pre-cession usage status and the specified post-cession usage status and calculates the capacity of the available resource with which the concession destination user is conceded from the concession source user based upon the calculated work time, the usage period included in the request from the concession source user and the usage period included in the request from the concession destination user and a concession managing unit that makes the resource of the capacity which the concession plan preparing unit calculates conceded from the concession source user to the concession destination user.

Besides, the present invention discloses a resource scheduling method executed in the above-mentioned information processor.

According to the present invention, the information processor and the resource scheduling method that enable resources to be securely conceded can be provided.

BRIEF DESCRIPTION OF THE DRAWINGS

FIG. 2 shows an example of a reservation request in the first embodiment.

FIG. 3 shows an example of an authority cession requirement list in the first embodiment.

FIG. 4 shows an example of an authority cession request list in the first embodiment.

FIG. 5 shows an example of a usage status change work time arithmetic expression list in the first embodiment.

FIG. 6 shows an example of a usage status change work process list in the first embodiment.

FIG. 7 shows an example of a resource list in the first embodiment.

FIG. 8 shows an example of an authority reservation list in the first embodiment.

FIG. 9 shows an example of a concession plan preparation start flag in the first embodiment.

FIG. 10 shows an example of a concession source/concession destination candidate list in the first embodiment.

FIG. 11 shows an example of a usage status change work candidate list in the first embodiment.

FIG. 12 shows an example of an available resource class list in the first embodiment.

FIG. 13 is a flowchart showing a procedure of a concession plan preparing/applying process.

FIG. 20 shows an example of a concession plan list.

FIG. 23 shows an example of usage status change work time results information.

FIG. 25 shows a transformed example of the concession plan list.

FIG. 26 shows an example in which a consent request is rejected.

FIG. 27 shows circumstances when a conventional type resource scheduling system cancels a reservation request.

DETAILED DESCRIPTION OF THE PREFERRED EMBODIMENTS

Referring to the attached drawings, embodiments of an information processor and a resource scheduling method according to this invention will be described in detail below; however, the present invention is not limited to these embodiments.

First Embodiment

Figure 1:
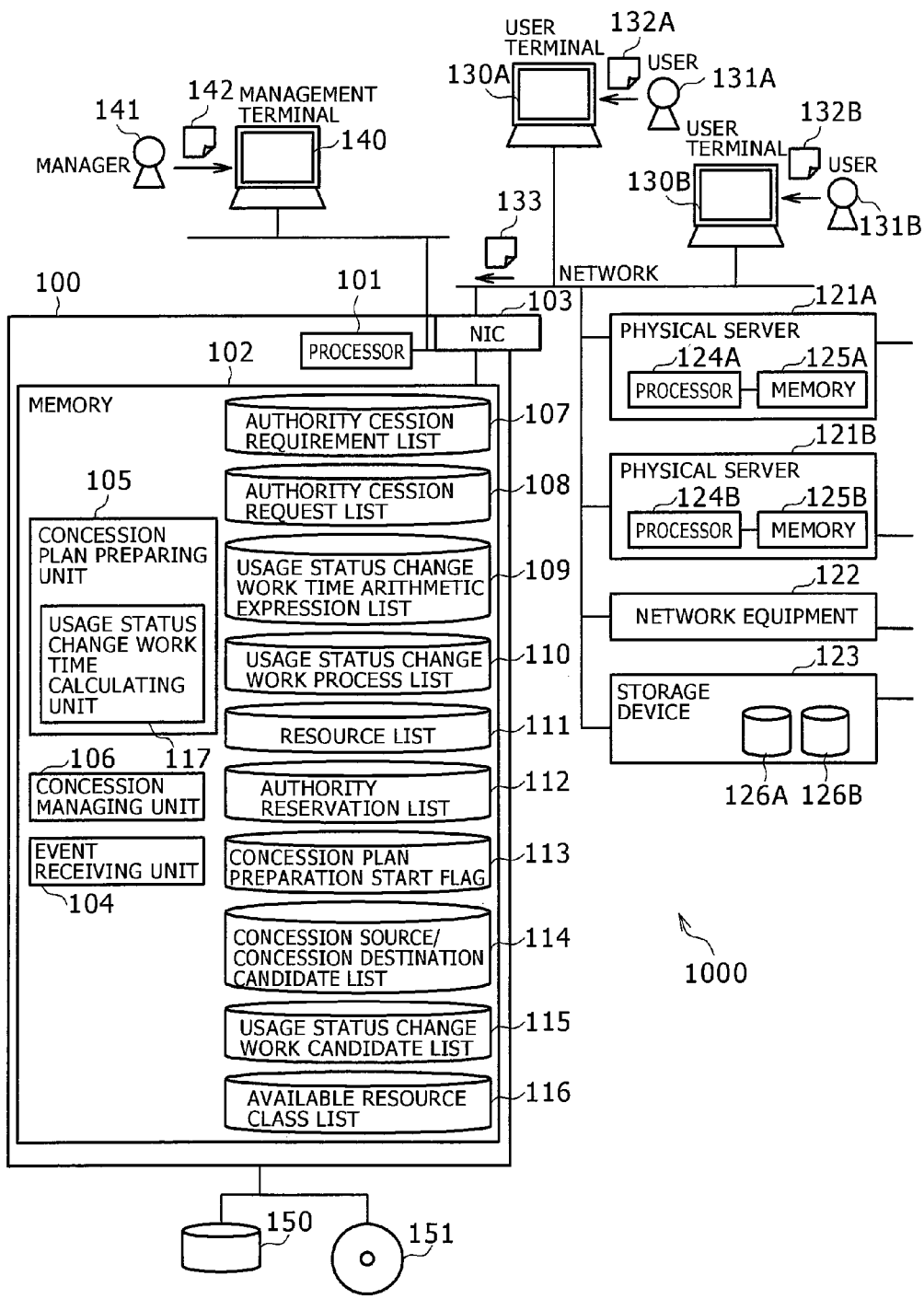
FIG. 1 is a block diagram showing the configuration of a resource scheduling system in a first embodiment.

FIG. 1 is a block diagram showing the configuration of a resource scheduling system 1000 in this embodiment. As shown in FIG. 1, the resource scheduling system includes PC 100 that manages a schedule of a resource, a physical server 121A, a physical server 121B, network equipment 122, a storage device 123, a user terminal 130A, a user terminal 130B and a management terminal 140.

In the following description, the physical server 121A and the physical server 121B may be also merely called a physical server 121, the user terminal 130A and the user terminal 130B may be also merely called a user terminal 130, and a user 131A and a user 131B may be also merely called a user 131. In addition, in FIG. 1, the two physical servers 121, the one network equipment 122 and the one storage device 123 are shown; however, the present invention is not limited to the number.

The PC 100 includes a processor 101, a memory 102 and a network interface card (NIC) 103 connected to the user terminal via a network. The PC 100 is connected to the user terminal 130A, the user terminal 130B and the management terminal 140 via the network. In FIG. 1, the two user terminals are shown, however, like the above-mentioned devices, the present invention is not limited to the number.

Each physical server 121 is connected to the user terminal 130 via a communication device such as NIC not shown and transmits/receives various information described later. When a processor 124 of the physical server 121 loads user data 126A and user data 126B respectively including a program for executing various processing described later into a memory 125 from the storage device 123, the physical server can execute the various processing.

The network equipment 122 is connected to the physical server 121 and the storage device 123 and transfers communication information required for referring to and updating the user data 126A and the user data 126B if necessary.

The storage device 123 stores the user data 126A and the user data 126B. The physical server 121A and the physical server 121B refer to and update these data via the network.

As shown in FIG. 1, in the resource scheduling system 1000 in this embodiment, the physical server 121, the network equipment 122 and the storage device 123 are included as a computer resource, however, in place of these, one or more simple computers such as PC may be also included.

The user terminal 130 accepts input information 132A and input information 132B respectively including a request of the user 131 for having the resource conceded by another user 131 (hereinafter called a reservation request) and transmits the reservation request 133 via the network. The details of the reservation request 133 will be described later referring to FIG. 2.

In that case, concession means reactivating the resource such as the physical server 121 and the storage device 123, executing work (hereinafter called usage status change work) for shifting environment in which the resource is used from a certain condition to another condition and shifting the authority of using the resource from the original user to the new user. And concession includes concepts of allocating resources.

The management terminal 140 accepts the input of various management information 142 for maintaining the PC 100, the physical server 121 and others from a manager 141. The management terminal 140 maintains each device such as the PC 100 and the physical server 124A according to the accepted management information.

A disk storage medium 150 and a magnetic storage medium 151 store a program and data respectively stored in the memory 102. When the processor 101 of the PC 100 calls the program stored in the disk storage medium 150 and the magnetic storage medium 151 and loads it into the memory 102, the PC 100 can execute various processing described later.

The memory 102 is a random access memory (RAM) for example and stores a program and data executed by the processor 101. Concretely, the memory stores an event receiving unit 104, a concession managing unit 105, a concession plan preparing unit 106, an authority cession requirement list 107, an authority cession request list 108, a usage status change work time arithmetic expression list 109, a usage status change work process list 110, a resource list 111, an authority reservation list 112, a concession plan preparation start flag 113, a concession source/concession destination candidate list 114, a usage status change work candidate list 115 and an available resource class list 116.

The event receiving unit 104 receives the reservation request 133 via the NIC 103. Concretely, the event receiving unit 104 receives the received reservation request 133 from the NIC 103 when the NIC 103 receives the reservation request transmitted from the user terminal 132. The event receiving unit 104 receives various data except the reservation request 133 from the user terminal 132A and other, and the reservation request 133 and these various data may be also merely called an event.

The concession plan preparing unit 105 prepares a concession plan for meeting the request when the event receiving unit 104 receives the reservation request 133. The concession plan preparing unit 105 includes a usage status change work time calculating unit 117, calls and activates the unit if necessary. The concrete processing of the concession plan preparing unit 105 and the usage status change work time calculating unit 117 will be described later using a flowchart.

The authority cession requirement list 107 stores conditions for transferring the authority of the resource the reservation of which is requested. In the authority cession requirement list 107, various conditions related to a user the concession to whom is settled by the reservation request 133 are stored, however, the concrete contents will be described later using FIG. 3.

The authority cession request list 108 stores information related to a user the concession to whom is not settled by the reservation request and who waits for the transfer of the authority of another user. The authority cession request list 108 stores the reservation requests 133 not stored in the authority cession requirement list 107 out of the reservation requests 133 received by the event receiving unit 104. The concrete contents of the concession request list 108 will be described later using FIG. 4.

The usage status change work time arithmetic expression list 109 stores an expression for calculating time (hereinafter called usage status change work time) required for usage status change work caused when the resource is conceded according to the reservation request. The concrete contents of the usage status change work time arithmetic expression list 109 will be described later using FIG. 5.

The usage status change work process list 110 stores a conceding method showing according to what procedure the resource is conceded when the reservation request is made. The concrete contents of the usage status change work process list 110 will be described later using FIG. 6.

The resource list 111 stores information related to a period when the reservation request for the resource is made. The concrete contents of the resource list 111 will be described later using FIG. 7.

The authority reservation list 112 stores information related to the resource the reservation request of which is made and the concession of which is settled. The concrete contents of the authority reservation list 112 will be described later using FIG. 8.

The concession plan preparation start flag 113 stores the information of whether or not the concession plan preparing unit 105 starts a concession plan preparing process described later. When the event receiving unit 104 executes event receiving processing described later, a value of the concession plan preparation start flag 113 is updated. Concrete processing by the concession plan preparing unit 105 will be described later using each drawing after FIG. 15.

The concession source/concession destination candidate list 114 stores information related to a concession source and a concession destination of the resource when the concession of the resource the reservation request of which is made is settled. The concrete contents of the concession source/concession destination candidate list 114 will be described later using FIG. 10.

The usage status change work candidate list 115 stores information related to usage status change work caused in a case that the resource the reservation request of which is made is conceded when the concession plan preparing unit 105 executes the concession plan preparing process described later. The concrete contents of the usage status change work candidate list 115 will be described later using FIG. 11.

The available resource class list 116 stores information for determining whether or not the concession of the resource the reservation request of which is made is possible when the concession plan preparing unit 105 executes the concession plan preparing process described later. The concrete contents of the available resource class list 116 will be described later using FIG. 12.

Next, the concrete contents of each data of the authority cession requirement list 107, the authority cession request list 108, the usage status change work time arithmetic expression list 109, the usage status change work process list 110, the resource list 111, the authority reservation list 112, the concession plan preparation start flag 113, the concession source/concession destination candidate list 114, the usage status change work candidate list 115 and the available resource class list 116 respectively shown in FIG. 1 will be described below referring to FIGS. 2 to 12.

FIG. 2 shows an example of the reservation request 133 in this embodiment. As shown in FIG. 2, the reservation request 133 includes a reservation request number 201, a user name 202, start time 203, a period 204, a usage status 205, resource capacity 206, and an authority cession requirement 207.

The reservation request number 201 uniquely specifies the reservation request 133. The user name 202 uniquely specifies a user who makes the reservation request. Concretely, the user name 202 is an identifier (ID) of the user 131 utilizing the user terminal 130. For contents held in a field of the user name 202, a concrete name of the user may be also used in place of ID such as User1.

The start time 203 is start timing when the user 131 who makes the reservation request has the resource conceded by another user 131. The period 204 is a period in which the user 131 who makes the reservation request 133 desires the concession of the resource. The usage status 205 shows the information (usage status information) of a condition of the utilization of the resource the concession of which the user 131 desires. For example, in a field of the usage status information, a value of a virtual server is stored when a certain server is utilized as a virtual server or a value of a physical server is stored when a certain server is utilized as a physical server.

The resource capacity 206 is resource capacity the concession of which the user 131 who makes the reservation request desires. For example, in a field of the resource capacity 206, values that number: 1, CPU activity ratio: 50%, memory used capacity: 1 GB are stored. In the following description, items for categorizing the conceded resource such as the number of resources, the activity ratio of CPU and the activity ratio of the memory respectively included in the resource capacity 206 may be also called a parameter name and values corresponding to the parameter names such as 1, 50% and 1 GB may be also called a parameter.

The authority cession requirement 207 is a condition for allowing the concession of the resource to another user 131 different from the user 131 who makes the reservation request when the concession of the resource is settled according to the reservation request in each processing described later. For example, in a field of the authority cession requirement, values that whether or not the concession is possible=Yes and restart time=2009/7/30 are stored when a certain resource is to be utilized since Jul. 30, 2009 is stored. Next, the authority cession requirement list 107 will be described.

FIG. 3 shows an example of the authority cession requirement list 107 in this embodiment. In the following description, when the concession of the resource is settled, a user who concedes the resource may be also called a concession source user and a user who has the resource conceded may be also called a concession destination user.

As shown in FIG. 3, the authority cession requirement list 107 includes authority cession requirement ID 301, a user name 302, start time 303, a period 304, a usage status 305, resource capacity 306, an authority cession requirement 307 and a reserved resource name 308.

The authority cession requirement ID 301 is identification information for specifying each record of the authority cession requirement list 107. The identification information of the concession source user is set in the user name 302, however, when the concession of the resource is settled, the identification information of the concession destination user who makes the reservation request 133 is set. Concretely, the user name 202 of the reservation request 133 shown in FIG. 2 is set.

The start time 303 is identical with the start time 203 in the reservation request information 133. The period 204 included in the reservation request 133 is set in the period 304. Similarly, the usage status 205 in the original reservation request 133 is set in the usage status 305 and the resource capacity 206 in the reservation request 133 is set in the resource capacity 306.

The authority cession requirement 307 is identical with the authority cession requirement 207 in the reservation request 133 and a resource name of a resource class 1202 (described later) corresponding to the usage status 205 included in the reservation request 133 is set in the reserved resource name 308 when the concession source user makes the reservation request.

FIG. 4 shows an example of the authority cession request list 108 in this embodiment. As shown in FIG. 4, the authority cession request list 108 includes authority transfer request ID 401, a user name 402, start time 403, a period 404, a usage status 405 and resource capacity 406.

The authority transfer request ID 401 is identification information for specifying each record of the authority cession request list 207. The user name 202 in the reservation request 133 is set in the user name 402. Similarly, the start time 203 in the reservation request 133 is set in the start time 403 and the period 204 in the reservation request 133 is set in the period 404. The usage status 205 in the reservation request 133 is set in the usage status 405 and the resource capacity 206 in the reservation request 133 is set in the resource capacity 406.

FIG. 5 shows an example of the usage status change work time arithmetic expression list 109 in this embodiment. As shown in FIG. 5, the usage status change work time arithmetic expression list 109 includes a usage status change work executor 501, usage status change work contents 502 and a usage status change work time arithmetic expression 503.

The usage status change work executor 501 is entity that executes usage status change work for conceding the resource. For example, the virtual server, the physical server and others are stored in a field of the usage status change work executor 501. The usage status change work contents 502 show what usage status change work is to be executed. For example, reserving a space area of CPU, freeing the memory and others are stored in a field of the usage status change work contents 502.

The usage status change work time arithmetic expression 503 is an expression and a value for calculating time required for usage status change work. For example, when the usage status change work content 502 is reserving a space area of CPU, a value of one second which is a fixed value is set. When the usage status change work content 502 is freeing the memory, "two minutes×(memory freed capacity)" is stored. In addition, when the usage status change work content 502 is freeing the memory, an expression of "one minute×(the memory freed capacity of the virtual machine)/(memory freeing speed)" may be also used. Each item described above is preset by the manager 141 and others.

FIG. 6 shows an example of the usage status change work process list 110 in this embodiment. As shown in FIG. 6, the usage status change work process list 110 includes a pre-cession usage status 601, a post-cession usage status 602, a condition 603, a usage status change work executor 604 and usage status change work contents 605.

The pre-cession usage status 601 is a usage status before the resource is conceded. The post-cession usage status 602 is a usage status after the resource is conceded. The condition 603 is a condition on which the usage status change work content 605 is applied. The usage status change work executor 604 is entity that executes concession work. Each item described above is preset by the manager 141 and others like the usage status change work time arithmetic expression list 109.

FIG. 7 shows an example of the resource list 111 in this embodiment. As shown in FIG. 7, the resource list 111 includes a resource class 701, a resource name 702, reserved start time 703 and a reserved period 704.

The resource class 701 is a class of the resources with which the resource scheduling system 1000 is provided. For example, the resource class is classified into ClassA, ClassB and others depending upon the specifications and the capacity of the resources or a type of a task. The resource name 702 shows a unit of the resource with which the concession destination user is conceded and is identification information for uniquely specifying the physical resource or a logical resource with which the resource scheduling system 1000 is provided for example. For example, for the resource name, a server A1 and others are stored as the logical resource or the physical server 121A and others are stored as the physical resource. The reserved start time 703 is identical with the start time 203 included in the reservation request 133. The reserved period 704 is equivalent to the period 204 in the reservation request 133.

The reserved start time 703 and the reserved period 704 are updated every time the event receiving unit 104 receives the reservation request 133. FIG. 7 shows that in the resource class 701 of the resources with which the resource scheduling system 1000 is provided, ClassA to ClassC exist and no reservation request is made for only the resource called a server C2 in the resource name 702 of ClassC out of them.

FIG. 8 shows an example of the authority reservation list 112 in this embodiment. As shown in FIG. 8, various information when concession is settled is included in the authority reservation list 112. Concretely, the authority reservation list 112 includes an authority reservation list number 801, a name of a user who makes a reservation 802, reserved start time 803, a reserved period 804, a reserved resource name 805, a usage status 806, the capacity of a reserved resource 807 and an authority cession requirement 808.

The reservation request number 201 in the reservation request 133 is set in the authority reservation list ID 801. Similarly, the name of the user who makes a reservation 802 is identical with the user name 202 in the reservation request 133 and the reserved start time 803 is identical with the start time 203 included in the reservation request 133.

The reserved period 804 is equivalent to the period 204 in the reservation request 133 and the reserved resource name 805 is identical with the reserved resource name 308 included in the authority cession requirement list 107 shown in FIG. 3. The usage status 806 is equivalent to the usage status 205 in the reservation request 133, the capacity of the reserved resource 807 is equivalent to the resource capacity 206 in the reservation request 133, and the authority cession requirement 808 is equivalent to the authority cession requirement 207 in the reservation request 133. Each item described above is not set until concession is settled in response to the reservation request 133 in each processing described later.

FIG. 9 shows an example of the concession plan preparation start flag 113 in this embodiment. The concession plan preparation start flag 113 is information showing whether or not a concession plan is prepared after the event receiving unit 104 executes event receiving processing. For example, in the concession plan preparation start flag 113, when a concession plan is prepared, information showing a state of On is stored and when no concession plan is prepared, information showing a state of Off is stored.

FIG. 10 shows an example of the concession source/concession destination candidate list 114 in this embodiment. The concession source/concession destination candidate list 114 stores information related to the resource which the concession destination user requests and information related to the resource of the concession source user who concedes the resource with both information correlated.

As shown in FIG. 10, the concession source/concession destination candidate list 114 includes a concession destination user name 1001, a concession destination usage status 1002, concession destination resource capacity 1003, reserved resource capacity 1004, a concession source user name 1005, a concession source usage status 1006, concession source resource capacity 1007, an conceding method 1008 and a reserved resource name 1009.

The concession destination user name 1001 is identification information for uniquely specifying the concession destination user and the user name 202 in the reservation request 133 is set. The concession destination usage status 1002 is a usage status of the resource which the concession destination user requests and the usage status 205 in the reservation request 133 is set. The concession destination resource capacity 1003 is resource capacity which the concession destination user requests and the resource capacity 2006 in the reservation request 133 is set. The reserved resource capacity 1004 is resource capacity with which the concession destination user is conceded.

The concession source user name 1005 is identification information for uniquely specifying the concession source user and the user name 202 in the reservation request 133 is set. The concession source usage status 1006 is a usage status when the concession source user uses the resource and the usage status 205 in the reservation request 133 is set. The concession source resource capacity 1007 is resource capacity when the concession source user uses the resource and the resource capacity 206 in the reservation request 133 is set. The conceding method 1008 denotes usage status change work applied to the resource which the concession source user uses and the resource which the concession destination user requests. The reserved resource name 1009 is identification information for uniquely specifying the resource which the concession source user concedes and the reserved resource name 308 in the authority cession requirement list 107 shown in FIG. 3 is set.

FIG. 11 shows an example of the usage status change work candidate list 115 in this embodiment. The usage status change work candidate list 115 stores work time when usage status change work is executed with the work time correlated every resource. As shown in FIG. 11, the usage status change work candidate list 115 includes a usage status change work executor 1101, a usage status change work candidate 1102, a usage status change work time estimated value 1103 and a usage status change work target resource name 1104.

The usage status change work executor 1101 is entity that executes usage status change work caused according to the concession of a resource and is equivalent to the usage status change work executor 604 in the usage status change work process list 110 shown in FIG. 6. The usage status change work candidate 1102 is a candidate of usage status change work and is equivalent to the usage status change work contents 605 in the usage status change work process list 110 shown in FIG. 6. The usage status change work time estimated value 1103 is an estimated value of time required for executing usage status change work described in fields of the usage status change work candidate 1102. The usage status change work target resource name 1104 is identification information for uniquely specifying the resource which is an object of usage status change work and is equivalent to the reserved resource name 308 included in the authority cession requirement list 107 shown in FIG. 3.

FIG. 12 shows an example of the available resource class list 116 in this embodiment. The available resource class list 116 stores information showing in what class the usage status 205 included in the reservation request 133 is to be used.

As shown in FIG. 12, the available resource class list 116 includes a usage status 1201 and a resource class 1202.

The usage status 1201 is similar to the usage status 205 in the reservation request 133. The resource class 1202 is a class at which the user 131 uses the resource in a condition shown in the usage status 1201 and is similar to the resource class 701 included in the resource list 111 shown in FIG. 7. These items are preset by the manager 141 and others.

The example shown in FIG. 12 shows that a resource class (having high specifications for example) called ClassA, ClassB is set when the resource is used in a condition called a virtual server shown in the usage status 1201 and shows that a resource class called ClassA having high specifications and ClassC having low specifications for example is set when the resource is used in a condition called a physical server shown in the usage status 1201.

Next, a process (a concession plan preparing/applying process) executed in the resource scheduling system 1000 will be described. FIG. 13 is a flowchart showing a procedure of the concession plan preparing/applying process.

In the concession plan preparing/applying process, usage status change work time is estimated according to the reservation request 133 specified by the user and a concession plan for guaranteeing contents specified in the reservation request 133 is prepared.

First, in the concession plan preparing/applying process, the event receiving unit 104 executes an event receiving process (a step S1301) when the reservation request 133 is received. The concession plan preparing unit 105 determines a value of the concession plan preparation start flag (a step S1302) and when it is determined that the concession plan preparation start flag 113 is turned on (the step S1302; Yes), the concession plan preparing unit 105 prepares a concession plan (a step S1303). In the meantime, when the concession plan preparing unit 105 determines that the concession plan preparation start flag is not turned on (the step S1302; No), control is returned to the step S1301.

The concession managing unit 106 determines whether or not the concession plan is prepared by the concession plan preparing unit 105 (a step S1304), when it is determined that the concession plan is prepared (the step S1304; Yes), the concession managing unit 106 selects the concession plan (a step 1305), and transmits a consent request to the concession source user and the concession destination user (a step S1306).

Afterward, the concession managing unit 106 waits for the receiving of a response for the acceptance of the consent request and when the response for the acceptance is received without time-out (a step S1307; Yes), the concession managing unit 106 applies the concession plan (a step S1308). In the meantime, when the concession managing unit 106 receives no response for acceptance and time-out occurs (the step S1307; No), control is returned to the step S1304.

When it is determined in the step S1304 that no concession plan is prepared by the concession plan preparing unit 105 (the step S1304; No), the concession managing unit 106 terminates the concession plan preparing/applying process shown in FIG. 13.

Figure 14:
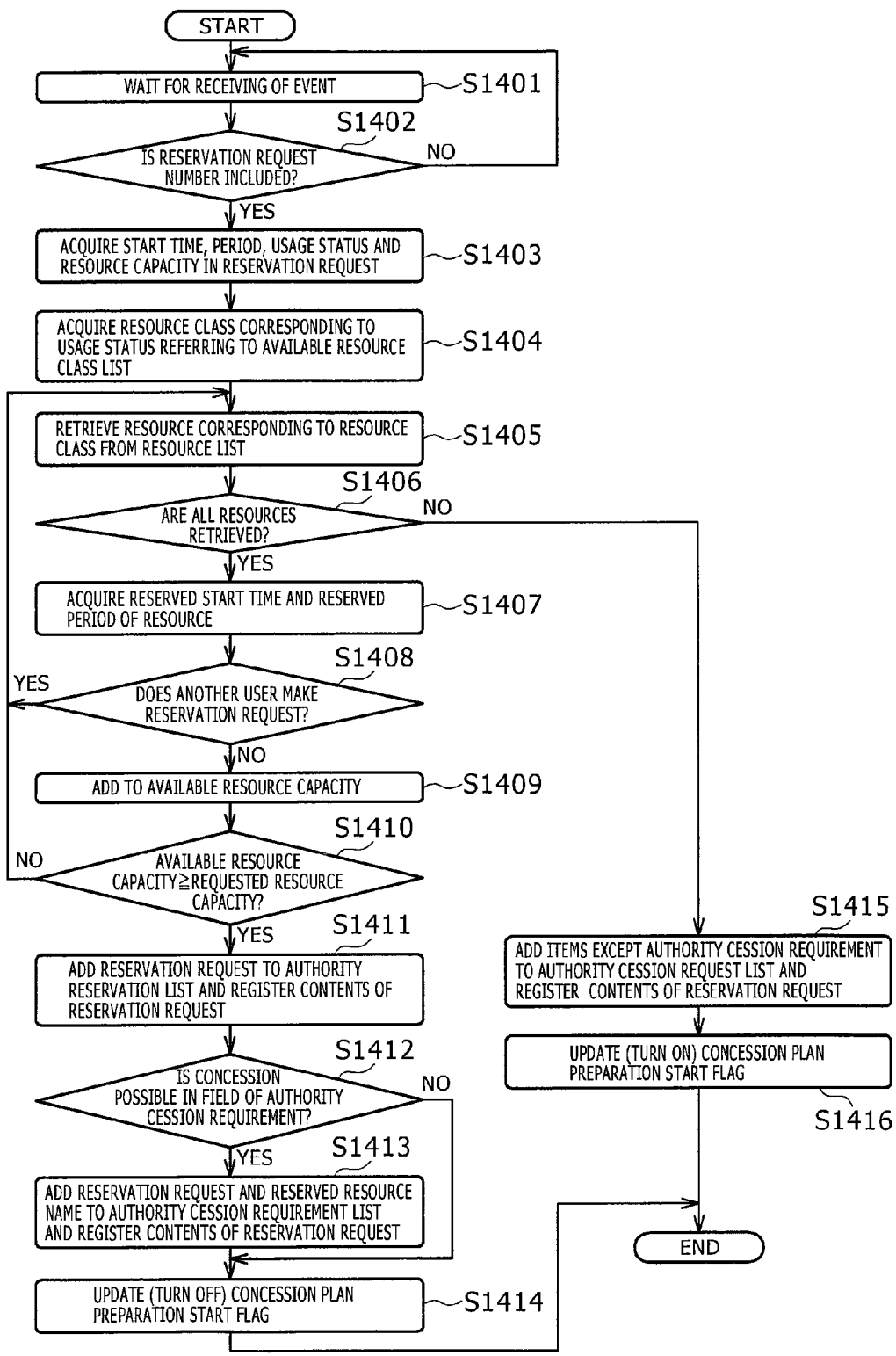
FIG. 14 is a flowchart showing a procedure of an event receiving process shown in FIG. 13.

FIG. 14 is a flowchart showing a procedure of the event receiving process shown in FIG. 13. As shown in FIG. 14, the event receiving unit 104 waits until it receives an event from the user terminal 130 (a step 1401). The event receiving unit 104 determines whether or not the reservation request number 201 is included in the received event (a step S1402).

When the event receiving unit 104 determines that no reservation request number 201 is included in the received event (the step S1402; No), it waits.

In the meantime, when the event receiving unit 104 determines that the reservation request number 201 is included in the received event (the step S1402; Yes), it judges that the received event is the reservation request 133 and acquires the start time 203, the period 204, the usage status 205 and the resource capacity 206 respectively included in the reservation request 133 (a step S1403).

Afterward, the event receiving unit 104 accesses to the available resource class list 116 shown in FIG. 12 and acquires the resource class 1202 corresponding to the usage status 205 (a step S1404).

The event receiving unit 104 retrieves a resource corresponding to the resource class 1202 acquired in the step S1403 referring to the resource list 111 (a step S1405). The event receiving unit 104 determines whether or not all resources included in the acquired resource class 1202 are retrieved (a step S1406).

For example, as the usage status 205 is a virtual server when the reservation request 133 shown in FIG. 2 is made, the event receiving unit 104 acquires ClassA, ClassB which is the resource class 1202 corresponding to the usage status 1201 referring to the usage status 1201 of the available resource class list 116 shown in FIG. 12. Further, the event receiving unit 104 retrieves a resource (for example, serverA1, serverA2) having the resource name 702 corresponding to the acquired resource class 1202 referring to the resource list 111 shown in FIG. 7. When the event receiving unit 104 determines that all resources (for example, serverA1, serverA2) are retrieved (the step S1406; Yes), control is transferred to a step S1415.

In the meantime, when the event receiving unit 104 determines that all resources (for example, serverA1, serverA2) are not retrieved (the step S1406; No), it acquires the reservation start time 703 and the reserved period 704 corresponding to a resource having the resource name 702 not retrieved yet in the resource class 1202 acquired in the step S1404 (a step S1407).

The event receiving unit 104 determines whether or not the start time 203 and the period 204 acquired in the step S1403 are included in the reservation start time 703 and the reserved period 704 acquired in the step S1407, that is, whether or not a reservation request from another user 131 is already made at time at which the reservation request is made (a step S1408).

When the event receiving unit 104 determines that the reservation request from another user 131 is already made at the time at which the reservation request is made (the step S1408; Yes), control is returned to the step S1405. In the meantime, when the event receiving unit determines that no reservation request from another user 131 is made at the time at which the reservation request is made (the step S1408; No), it adds the number of resources having the resource name 702 for which no reservation request is made to the number of available resources (a step S1409).

For example, when three resources (that is, available resource capacity) having the resource name 702 for which no reservation request is made already exist, the event receiving unit 104 adds a value of the number (for example, 1 in the example shown in FIG. 2) included in the resource capacity 206 in the reservation request 133 to the number of 3 and the number of available resources is incremented to 4.

The event receiving unit 104 compares the number of resources having the available resource name 702 and the number of the resource capacity 206 included in the reservation request 133 and determines whether or not the number of the resource capacity having the available resource name 702 is equal to or larger than the number of the resource capacity 206 included in the reservation request 133 (a step S1410). When the event receiving unit 104 determines that the number of resources having the available resource name 702 is not equal to or is not larger than the number of the resource capacity 206 the reservation of which is requested (the step S1410; No), control is returned to the step S1405 and processing in the steps S1405 to S1410 is repeated.

In the meantime, when the event receiving unit 104 determines that the number of resources having the available resource name 702 is equal to or larger than the number of the resource capacity 206 the reservation of which is requested (the step S1410; Yes), it adds the reservation request 133 to the authority reservation list 112 and registers the contents of the reservation request 133 (a step S1411). As described above, concession in response to the reservation request is not settled until resources equivalent to the number of the resource capacity 206 the reservation of which is requested are reserved and the contents of the reservation request are registered in the authority reservation list 112.

The event receiving unit 104 sets the resource name 702 corresponding to the usage status 205 included in the reservation request 133 in the reserved resource name 805 in the authority reservation list 112 referring to the resource list 111 and the available resource class list 116 when the reservation request 133 is registered in the authority reservation list 112. The contents of each item of the reservation request 133 are set in each item except the reserved resource name 805. As described above, only the reservation request the concession of which is settled as described above out of reservation requests 133 is sequentially added to the authority reservation list 112.

For example, in FIG. 8, the event receiving unit 104 executes processing in the steps S1401 to S1411, registers each item of the reservation request 133 in which the user name 302 shown in FIG. 2 is User1 in each item of the authority reservation list 112, and further similarly, registers each item of the reservation request 133 in which the user name 302 shown in FIG. 2 is User3 in each item of the authority reservation list 112.

Afterward, the event receiving unit 104 determines whether or not concession is possible (Yes) referring to the authority cession requirement 207 included in the reservation request 133 received in the step S1401 (a step S1412). When the event receiving unit 104 determines that concession is not possible (the step S1412; No), control is transferred to a step S1414.

In the meantime, when the event receiving unit 104 determines that concession is possible (the step S1412; Yes), it adds the reservation request 133 added to the authority reservation list 112 in the step S1411 and the reserved resource name 805 to the authority cession requirement list 107 (a step S1413).

For example, in FIG. 8, as concession is possible (Yes) in the authority cession requirement 207 included in the reservation request 133 in which the user name is User1, the reservation request 133 in which the user name shown in FIG. 2 is User1 and the reserved resource name 805 are added to the authority cession requirement list 107 shown in FIG. 3. The resource name 702 shown in FIG. 7 retrieved by the event receiving unit 104 in the step S1405 is set in the reserved resource name 805.

In the authority reservation list 112 shown in FIG. 8, as concession is not possible (No) in the authority cession requirement 207 in the reservation request 133 in which the user name is User3, the reservation request is not added to the authority cession requirement list 107 shown in FIG. 3. That is, in the authority cession requirement list 107 shown in FIG. 3, only the reservation request in which the user 131 who makes the reservation request 133 and settles its concession allows another user 131 to further use the resource is registered.

When the step S1412 or the step 1413 is finished, the event receiving unit 104 turns off the concession plan preparation start flag 113 to prevent the concession plan preparing process described later from being started (the step S1414).

When the event receiving unit 104 determines that all resources are retrieved (the step 1406; Yes) in the step S1406, it adds items except the authority cession requirement 207 out of each item in the reservation request 133 received in the step S1401 to the authority cession request list 108 (the step S1415) and the event receiving unit 104 turns on the concession plan preparation start flag 113 to start the concession plan preparing process (a step S1416).

For example, in FIG. 4, the event receiving unit 104 receives the reservation request 133 in which the user name is User2, however, as a resource matched with the condition in the reservation request cannot be retrieved in the steps S1401 to S1410 (for example, no resource specified in the resource capacity 406 is found for 10 days in the period 404 since 2009/NN/NN in the start time 403), the reservation request 133 in which the user name is User2 is registered in the authority cession request list 108. The reservation request 133 in which the user name is User4 is also similarly registered in the authority cession request list 108.

That is, in the authority cession request list 108 shown in FIG. 4, only the reservation request 133 as to which no reservation is settled and as to which no resource is conceded from another user 131 is registered.

When processing in the step S1416 is finished, all processing in the event receiving process shown in FIG. 14 is finished. The event receiving unit 104 determines whether or not the concession plan preparing process described later is necessary by executing the event receiving process shown in FIG. 14 as described above. Next, the concession plan preparing process shown in FIG. 13 will be described.

Figure 15:
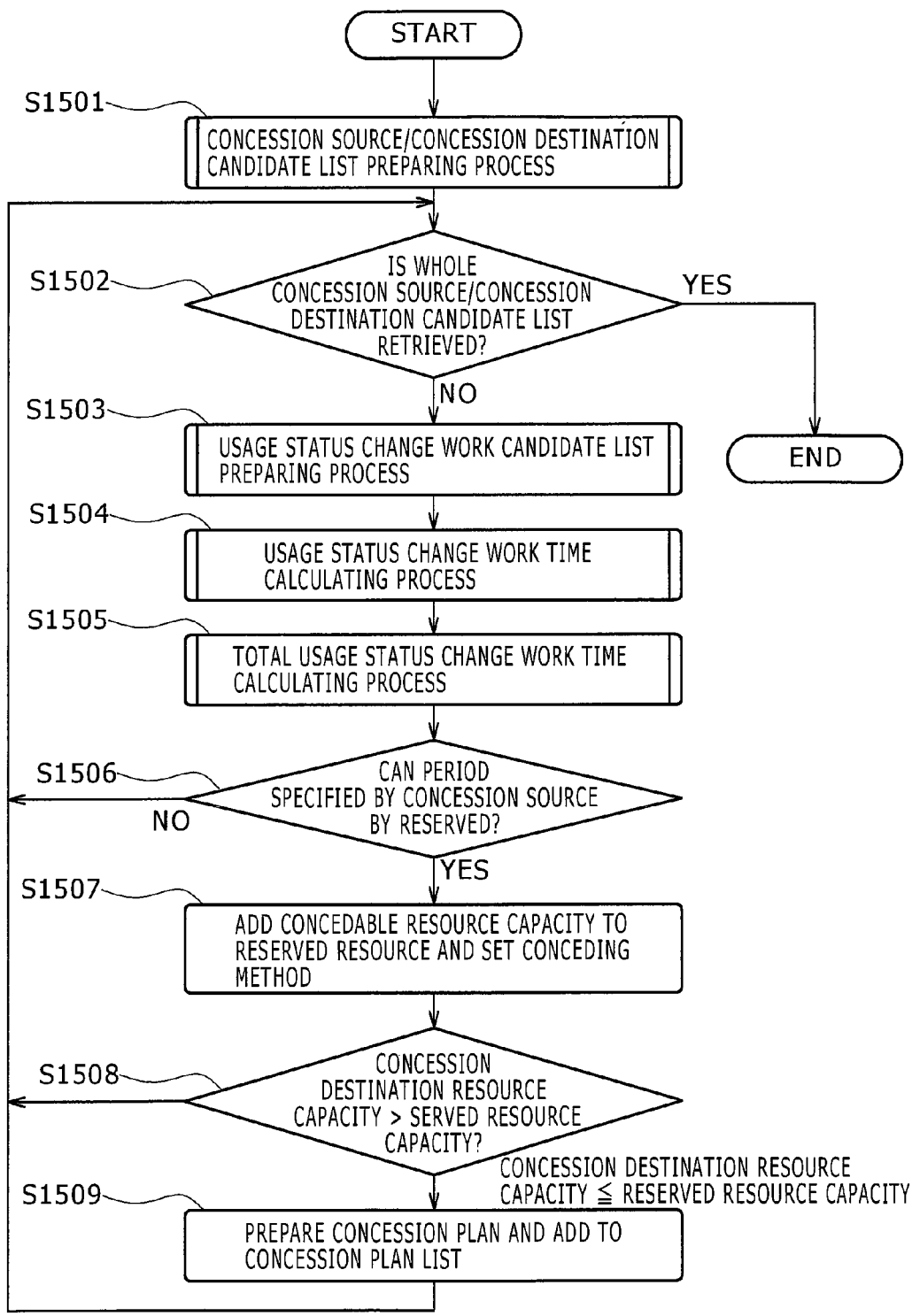
FIG. 15 is a flowchart showing a procedure of a concession plan preparing process in the first embodiment.

FIG. 15 is a flowchart showing a procedure of the concession plan preparing process in this embodiment. As shown in FIG. 15, the concession plan preparing unit 105 first executes a concession source/concession destination candidate list preparing process (a step S1501).

Figure 16:
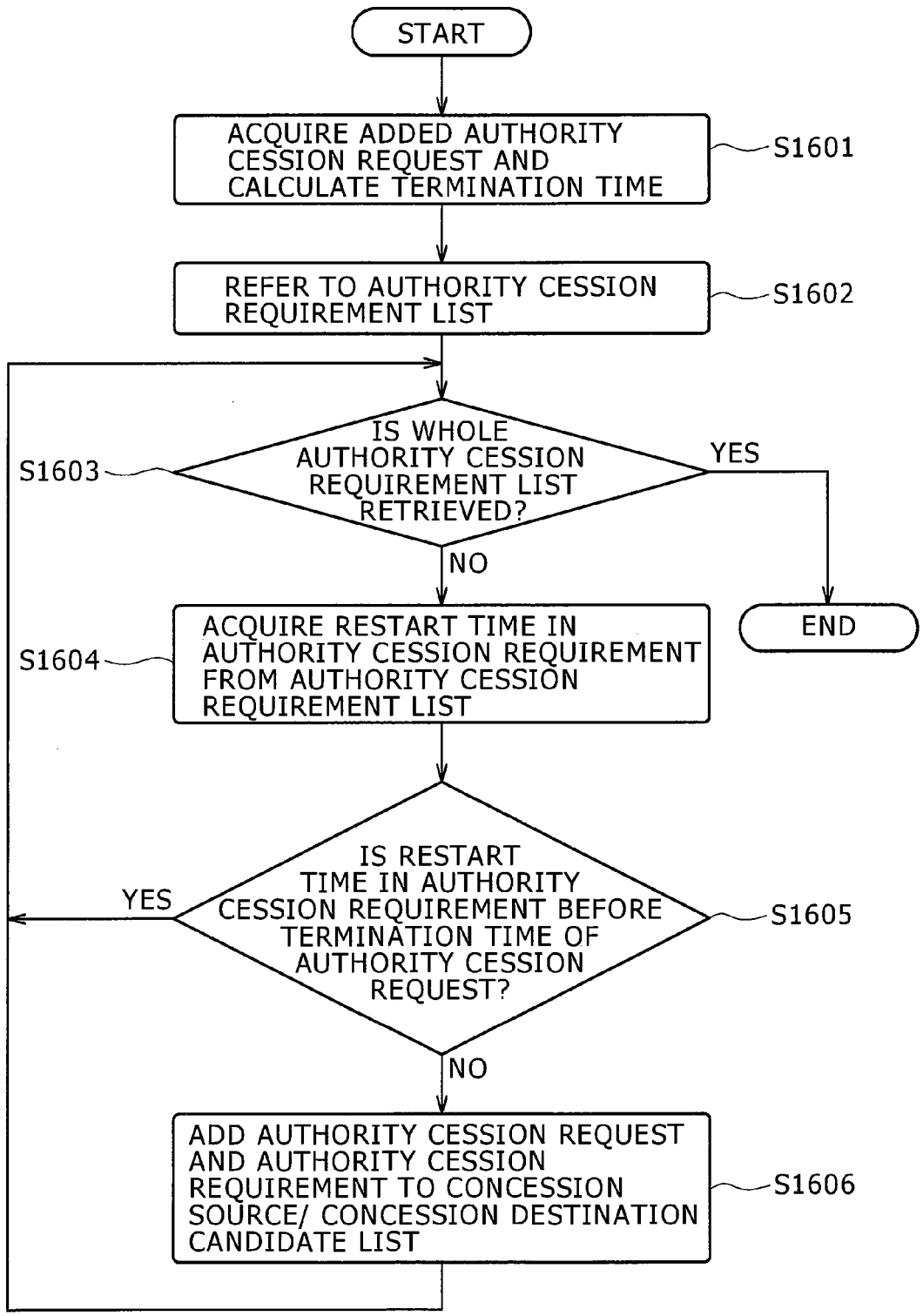
FIG. 16 is a flowchart showing a procedure of a concession source/concession destination candidate list preparing process shown in FIG. 15.

FIG. 16 is a flowchart showing a procedure of the concession source/concession destination candidate list preparing process shown in FIG. 15. As shown in FIG. 16, the concession plan preparing unit 105 first acquires items except the authority cession requirement 207 added in the step S1415 shown in FIG. 14 referring to the authority cession request list 108, adds the period 404 to the start time 403 out of the acquired items, and calculates termination time (a step S1601).

Afterward, the concession plan preparing unit 105 determines whether or not all records are retrieved (that is, whether or not an unprocessed record exists) referring to the authority cession requirement list 107 in a step S1602 (a step S1603). When the concession plan preparing unit 105 determines that all records in the authority cession requirement list 107 are retrieved (the step S1603; Yes), it terminates the concession source/concession destination candidate list preparing process.

As for the concrete determination of whether or not all the records in the authority cession requirement list 107 are retrieved, the concession plan preparing unit 105 retrieves records in the authority cession requirement list 107 using the authority cession requirement ID 301 for a key for example and stores the authority cession requirement ID 301 of the record in a memory not shown and others when retrieval is finished. The concession plan preparing unit 105 determines whether or not all the records in the authority cession requirement list 107 are retrieved by executing the process up to the final record. In the following description, similarly, it is also determined whether or not all records are retrieved using a certain item for a key.

In the meantime, when the concession plan preparing unit 105 determines that all the records in the authority cession requirement list 107 are not retrieved (the step S1603; No), it acquires the records in the authority cession requirement list 107 and acquires restart time included in the authority cession requirement 307 (a step S1604).

The concession plan preparing unit 105 compares the termination time calculated in the step S1601 and the restart time acquired in the step S1604 and determines whether or not the restart time is prior to the termination time, that is, whether or not a period in which the concession source user uses the resource and a period in which the concession destination user uses the resource are overlapped (a step S1605).

When the concession plan preparing unit 105 determines that the restart time is prior to the termination time (the step S1605; Yes), control is returned to the step S1603 and processing in the steps S1603 to S1605 is repeated.

In the meantime, when the concession plan preparing unit 105 determines that the restart time is not prior to the termination time (the step S1605; No), it adds each item in the authority cession request list 108 acquired in the step S1601 and each item in the authority cession requirement list 107 referred in the step S1602 to the concession source/concession destination candidate list 114 (a step S1606).

For example, in the concession source/concession destination candidate list 114 shown in FIG. 10, User2 in the user name 402 in the authority cession request list 108 shown in FIG. 4 is set in the concession destination user name 1001 and a virtual server in the usage status 405 in the authority cession request list 108 is set in the concession destination usage status 1002. Further, "number: 1, CPU activity ratio: 50%, memory used capacity: 1 GB" in the resource capacity 406 in the authority cession request list 108 is set in the concession destination resource capacity 1003.

User1 in the user name 302 in the authority cession requirement list 107 shown in FIG. 3 is set in the concession source user name 1005 and a virtual server in the usage status 305 in the authority cession requirement list 107 is set in the concession source usage status 1006. Further, the resource capacity 306 and the reserved resource name 308 in the authority cession requirement list 107 are set in the concession source resource capacity 1007 and the reserved resource name 1009.

As described above, various information of which concession destination user is conceded with the resource by which concession source user is set in the concession source/concession destination candidate list 114 with the various information correlated. At this stage, an initial value (for example, number: 0, CPU activity ratio: 0%, memory used capacity: 0 GB) is set in the reserved resource capacity 1004 and the conceding method 1008. When processing in the step S1606 is finished, control is returned to the step S1603 and the concession plan preparing unit 105 terminates the concession source/concession destination candidate list preparing process. Next, each processing after the step S1502 shown in FIG. 15 in the concession plan preparing process will be described.

When the concession source/concession destination candidate list preparing process is finished, the concession plan preparing unit 105 determines whether or not all records in the concession source/concession destination candidate list 114 are retrieved (that is, whether or not an unprocessed record exists) (the step S1502).

When the concession plan preparing unit 105 determines that all records in the concession source/concession destination candidate list 114 are not retrieved (the step S1502; No), it executes a usage status change work candidate list preparing process (a step S1503).

Figure 17:
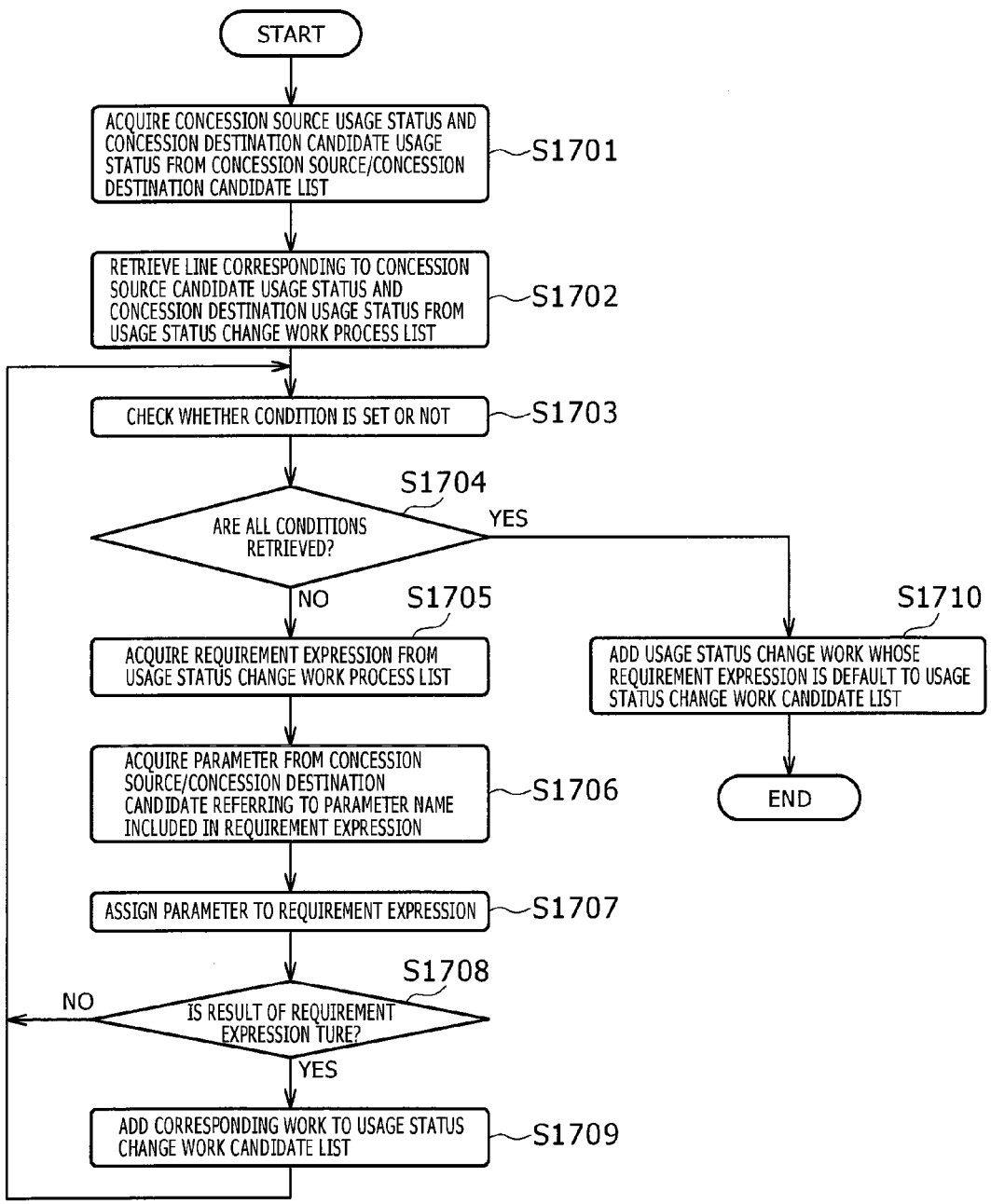
FIG. 17 is a flowchart showing a procedure of a usage status change work candidate list preparing process shown in FIG. 15.

FIG. 17 is a flowchart showing a procedure of the usage status change work candidate list preparing process shown in FIG. 15. As shown in FIG. 17, the concession plan preparing unit 105 acquires the concession source usage status 1006 and the concession destination usage status 1002 referring to the concession source/concession destination candidate list 114 shown in FIG. 10 (a step S1701).

The concession plan preparing unit 105 retrieves a record that meets both the concession source usage status 1006 and the concession destination usage status 1002 respectively acquired (a step S1702) and determines whether or not a condition is set in the retrieved record (a step S1703).

For example, as the concession source usage status 1006 and the concession destination usage status 1002 in the concession source/concession destination candidate list 114 shown in FIG. 10 are both a virtual server, the concession plan preparing unit retrieves a record in which the pre-cession usage status 601 and the post-cession usage status 602 in the usage status change work process list 110 shown in FIG. 6 are both a virtual server and determines whether or not a condition is set in a field of the condition 603 included in the record. In an example shown in FIG. 10, as "the CPU activity ratio of reserved resource capacity is below the CPU activity ratio of concession destination resource capacity (reserved resource capacity 1004 (CPU activity ratio)≦concession destination resource capacity 1003 (CPU activity ratio))" and "the memory used capacity of reserved resource capacity is below the memory used capacity of concession destination resource capacity (reserved resource capacity 1004 (memory used capacity)≦concession destination resource capacity 1003 (memory used capacity))" are set in the field of the condition 603, the concession plan preparing unit 105 determines that the condition is set in the retrieved record.

Afterward, the concession plan preparing unit 105 determines whether or not all conditions are retrieved (that is, whether or not an unprocessed condition exists) (a step S1704) and when the concession plan preparing unit determines that all the conditions are not retrieved (the step S1704; No), it acquires a requirement expression set in the condition 603 (a step S1705). The concession plan preparing unit 105 acquires parameters set in the reserved resource capacity 1004 and the concession destination resource capacity 1003 respectively included in the concession source/concession destination candidate list 114 shown in FIG. 10 using the following parameter names for a key referring to the parameter names included in the acquired requirement expression (a step S1706).

For example, as "CPU activity ratio" and "memory used capacity" are included as parameter names in the field of the condition 603 in the usage status change work process list 110 shown in FIG. 6, the concession plan preparing unit acquires a parameter, "50%" corresponding to the parameter name, "CPU activity ratio" set in the reserved resource capacity 1004 in the concession source/concession destination candidate list 114 shown in FIG. 10 and a parameter, "50%" corresponding to the parameter name, "CPU activity radio" set in the concession destination resource capacity 1003 using these parameter names for a key.

Further, the concession plan preparing unit 105 acquires a parameter, "0.4 GB" corresponding to the parameter name, "memory used capacity" set in the reserved resource capacity 1004 in the concession source/concession destination candidate list 114 shown in FIG. 10 and a parameter, "1 GB" corresponding to the parameter name, "memory used capacity" set in the concession destination resource capacity 1003.

Afterward, the concession plan preparing unit 105 assigns the acquired parameters in the requirement expressions set in the condition 603 (a step S1707) and determines whether or not results of the requirement expressions are true (a step S1708). When the concession plan preparing unit 105 determines that the results of the requirement expressions are not true (the step S1708; No), control is returned to the step S1703 and processing in the steps S1703 to S1708 is repeated.

In the meantime, when the concession plan preparing unit 105 determines that the results of the requirement expressions are true (the step S1708; Yes), the usage status change work executor 604 and the usage status change work contents 605 are added to the usage status change work candidate list 115 shown in FIG. 11 (a step S1709), control is returned to the step S1703, and processing in the steps S1703 to S1708 is repeated.

For example, in an example shown in FIG. 6, as the requirement expression, "reserved resource capacity 1004 (CPU activity ratio)≦concession destination resource capacity 1003 (CPU activity ratio)" in the condition 603 is "50%=50%" and the requirement expression, "reserved resource capacity 1004 (memory used capacity)≦concession destination resource capacity 1003 (memory used capacity)" is "0.4<1.0 GB", the concession plan preparing unit 105 determines that the results of these requirement expressions are true.

The concession plan preparing unit 105 acquires the usage status change work executor 604 and the usage status change work contents 605 respectively corresponding to these requirement expressions referring to the usage status change work process list 110 shown in FIG. 6 and adds the usage status change work executor 604 and the usage status change work contents 605 respectively acquired to the usage status change work candidate list 115 shown in FIG. 11 (a step S1709).

For example, as the usage status change work executor 604 corresponding to the requirement expression related to "CPU activity ratio" out of the requirement expressions shown in FIG. 6 is a virtual supervisor and the usage status change work contents 605 are "reserving CPU space area", these values are added to the usage status change work candidate list 115 shown in FIG. 11.

Besides, as the usage status change work executor 604 corresponding to the requirement expression related to "memory used capacity" out of the requirement expressions shown in FIG. 6 is a virtual server and the usage status change work contents 605 are "freeing the memory", these values are added to the usage status change work candidate list 115 shown in FIG. 11. Values are set in the usage status change work time estimated value 1103 in the usage status change work candidate list 115 shown in FIG. 11, however, these values are set in the usage status change work time calculating process described later.

When processing in the step S1709 is finished, control is returned to the step S1703 and afterward, each processing is repeated. When it is determined in the step S1704 that all conditions are retrieved (the step S1704; Yes), control is transferred to a step S1710.

In the step S1710, the concession plan preparing unit 105 retrieves a condition which is default in the condition 603 shown in FIG. 6 and adds "activating a virtual server" in the usage status change work contents 605 corresponding to the condition, "default" to the usage status change work candidate list 115 shown in FIG. 11 (the step S1710). As the activation of a virtual server and others is necessarily required when the resource such as a virtual server is conceded, that is, when usage status change work is executed, such setting is made in S1710 which is the last step of the usage status change work candidate list preparing process. Next, returning to FIG. 15, each processing after a step S1504 of the concession plan preparing process will be described.

Figure 18:
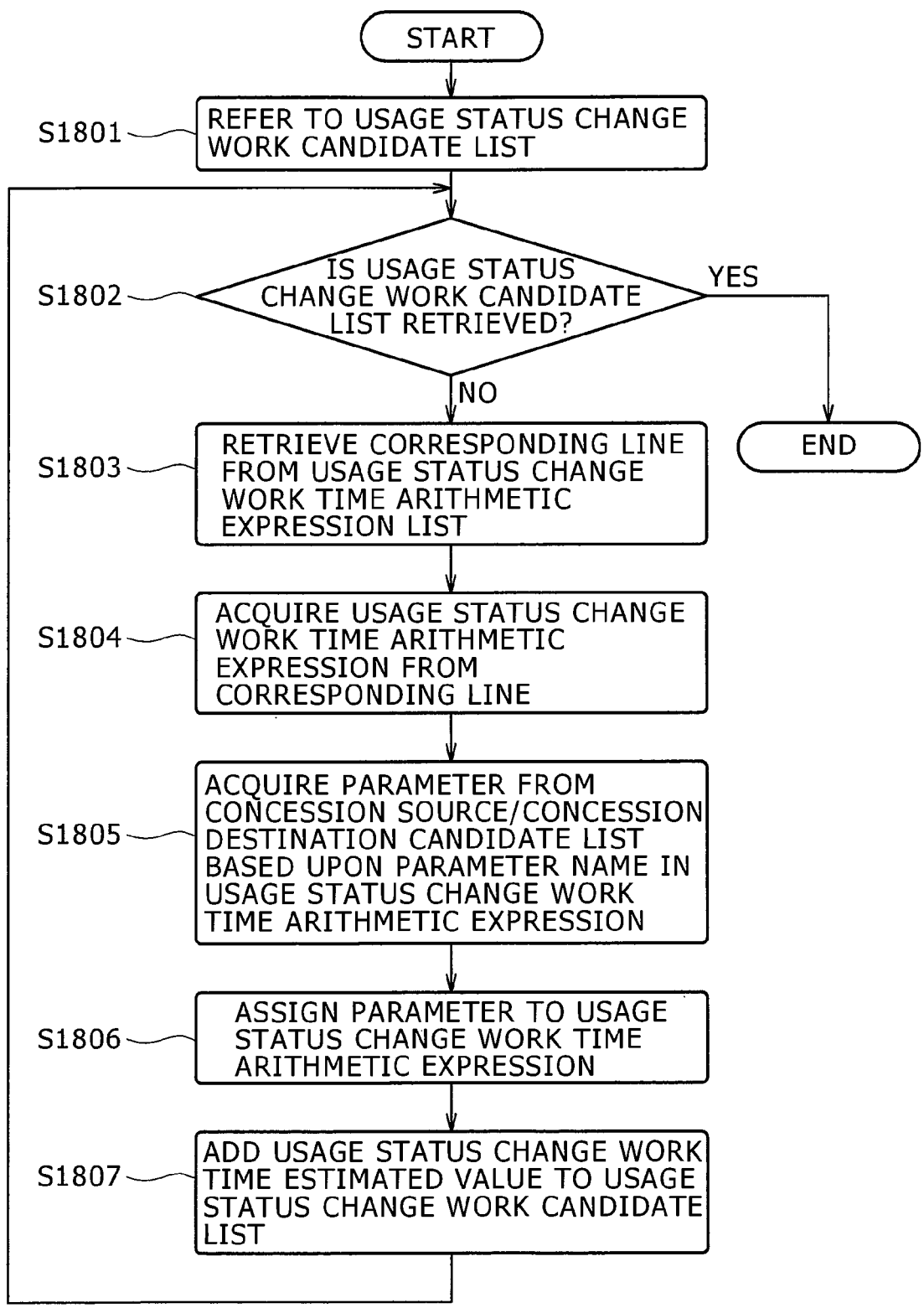
FIG. 18 is a flowchart showing a procedure of a usage status change work time calculating process.

The concession plan preparing unit 105 executes a usage status change work time calculating process (the step S1504) when the usage status change work candidate list preparing process (the step S1503) is finished. FIG. 18 is a flowchart showing the procedure of the usage status change work time calculating process.

As shown in FIG. 18, the usage status change work time calculating unit 117 determines whether or not all records in the usage status change work candidate list 115 are retrieved (a step S1802) referring to the usage status change work candidate list 115 (a step S1801).

The usage status change work time calculating unit 117 retrieves a record matched with the record in the referred usage status change work candidate list 115 in the usage status change work time arithmetic expression list 109 shown in FIG. 5 (a step S1803) when the usage status change work time calculating unit determines that all the records in the usage status change work candidate list 115 are not retrieved (the step S1802; No), and acquires the usage status change work time arithmetic expression 503 corresponding to the record (a step S1804).

For example, as the usage status change work executor 1101 in a first record in the usage status change work candidate list 115 shown in FIG. 11 is a virtual server and the usage status change work candidate 1102 is "freeing the memory", the usage status change work time calculating unit 117 retrieves a record (in this case, a second record) including the usage status change work executor 501 and the usage status change work contents 502 respectively having the same values as these, and acquires the usage status change work time arithmetic expression 503 (in this case, "2 min.×memory freed capacity") corresponding to the retrieved usage status change work executor 501 and the retrieved usage status change work contents 502.

Afterward, the usage status change work time calculating unit 117 acquires a parameter corresponding to the same parameter name as the following parameter name referring to the parameter name included in the acquired usage status change work time arithmetic expression 503 (a step S1805), calculates usage status change work time by assigning the acquired parameter in the usage status change work time arithmetic expression 503 (a step S1806), and sets the calculated usage status change work time in the usage status change work time estimated value 1103 in the usage status change work candidate list 115 shown in FIG. 11 (a step S1807).

For example, the usage status change work time calculating unit 117 acquires a parameter name, "memory used capacity", first referring to the usage status change work contents 605 in the usage status change work process list 110 shown in FIG. 6 and referring to an arithmetic expression, "memory freed capacity=memory used capacity of concession destination resource capacity−memory used capacity of reserved resource capacity" for acquiring memory freed capacity described together with freeing the memory when "2 min.×memory freed capacity" is acquired as the usage status change work time arithmetic expression 503.

Afterward, the usage status change work time calculating unit 117 acquires the same parameter name as the acquired parameter name, "memory used capacity" in the concession destination resource capacity 1003 and the reserved resource capacity 1004 respectively included in the concession source/concession destination candidate list 114 shown in FIG. 10, and acquires parameters, 1 GB and 0.4 GB corresponding to the parameter names.

The usage status change work time calculating unit 117 acquires a value of "memory freed capacity", 0.6 GB by assigning the acquired parameters, 1 GB and 0.4 GB in the above-mentioned arithmetic expression. The usage status change work time calculating unit 117 assigns the acquired value of "memory freed capacity", 0.6 GB in the usage status change work time arithmetic expression 503, "2 min.× memory freed capacity", calculates usage status change work time, 1.2 min./GB, and sets the calculated usage status change work time in the usage status change work time estimated value 1103.

When the step S1807 is finished, control is returned to the step S1802 and processing in the steps S1802 to S1807 is repeated. The usage status change work time calculating unit 117 terminates the usage status change work time calculating process shown in FIG. 18 when it is determined in the step S1802 that all records in the usage status change work candidate list 115 are retrieved (the step S1802; Yes). Next, returning to FIG. 15, each processing after a step S1505 will be described.

When the usage status change work time calculating process (the step S1504) is finished, the usage status change work time calculating unit 117 executes a usage status change work total time calculating process (the step S1505).

Figure 19:
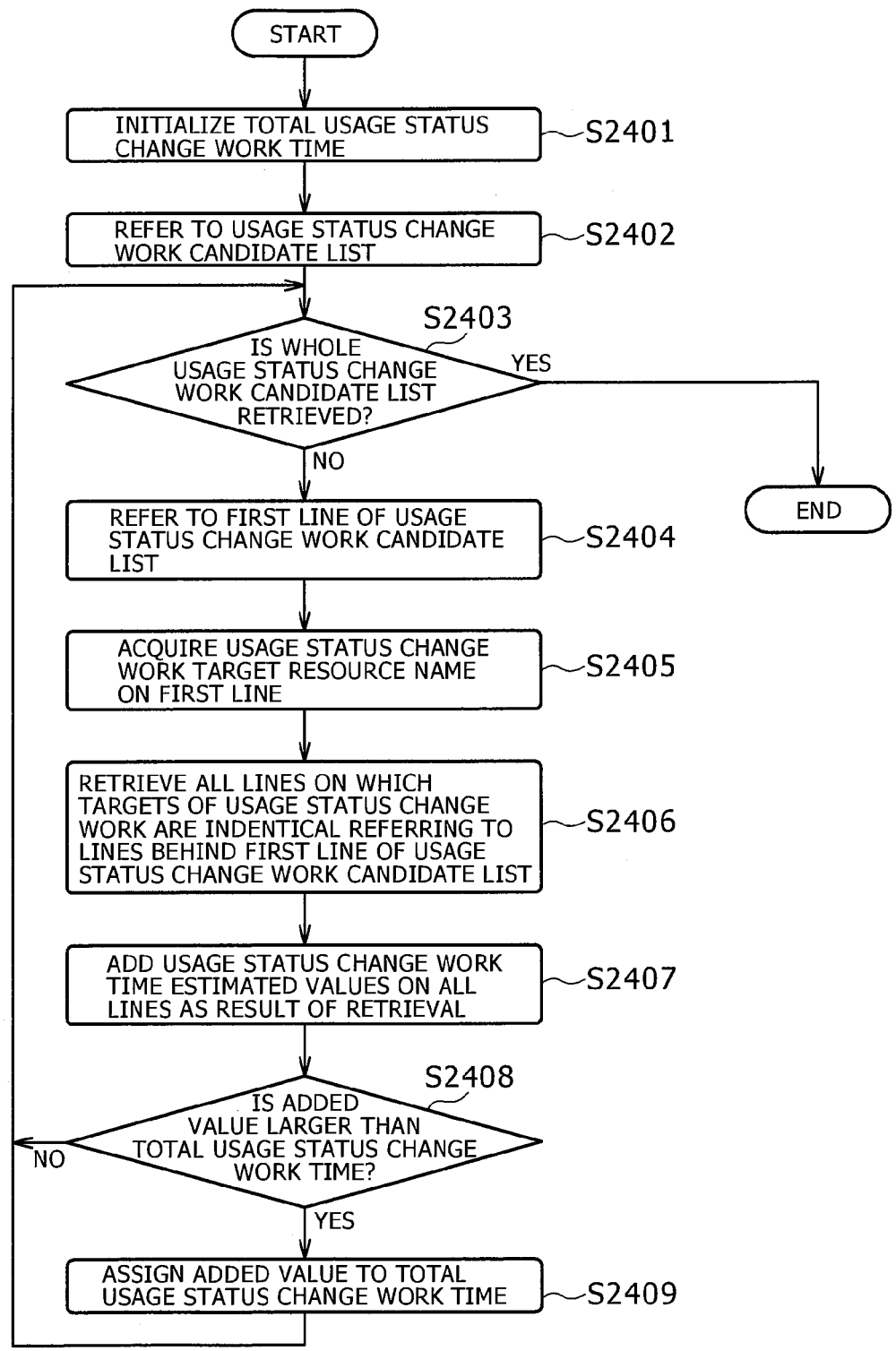
FIG. 19 is a flowchart showing a procedure of a usage status change work total time calculating process.

FIG. 19 is a flowchart showing a procedure of the usage status change work total time calculating process. As each work is sequentially performed when each work in the usage status change work candidate list 115 shown in FIG. 11 is performed with the same resource as an object, usage status change work time is calculated by adding each work time. In the meantime, as usage status change work is performed in parallel when each work in the usage status change work candidate list 115 is performed with separate resources as objects (for example, when a certain user requests the concession of plural resources at the same time), a maximum value of each work time acquired every resource is to be calculated for usage status change work time.

Accordingly, as described below, in the usage status change work total time calculating process, respective usage status change work time is added or the maximum value is calculated by determining whether or not the resource which is an object of each work in the usage status change work candidate list 115 is the same resource to consider such a situation and usage status change work total time is calculated.

As shown in FIG. 19, the usage status change work time calculating unit 117 initializes usage status change work total time (a step S2401). The usage status change work total time is stored on a storage medium such as a memory not shown and as the following time is stored on the storage medium such as a memory not shown when the usage status change work time calculating unit 117 calculated the usage status change work total time in the past, the time is initialized in the step S2401 as described above.

The usage status change work time calculating unit 117 determines whether or not all records in the usage status change work candidate list 115 are retrieved (a step S2403), referring to the usage status change work candidate list 115 (a step S2402) and when the usage status change work time calculating unit determines that all the records in the usage status change work candidate list 115 are retrieved (the step S2403; Yes), it terminates the usage status change work total time calculating process shown in FIG. 19.

In the meantime, when the usage status change work time calculating unit 117 determines that all the records in the usage status change work candidate list 115 are not retrieved (the step S2403; No), it retrieves the first record in the usage status change work candidate list 115 (a step S2404) and acquires the usage status change work resource name 1104 included in the retrieved record (a step S2405).

Afterward, the usage status change work time calculating unit 117 retrieves the record including the same usage status change work resource name 1104 as the acquired usage status change work resource name 1104 (a step S2406) and adds the usage status change work time estimated value 1103 included in the retrieved record (a step S2407).

For example, the usage status change work time calculating unit 117 retrieves the first record in the usage status change work candidate list 115 shown in FIG. 11 and acquires the usage status change work resource name 1104, serverA1. The usage status change work time calculating unit 117 retrieves the records including the same usage status change work resource name 1104 as the acquired serverA1 (the second and fourth records in an example shown in FIG. 11) and acquires a value, 6.2 min. 0.5 sec. acquired by adding the usage status change work time estimated value 1103 (in the example shown in FIG. 11, 5 min., 0.5 sec.) included in the records to the usage status change work time estimated value 1103, 1.2 min. included in the first record.

The usage status change work time calculating unit 117 determines whether or not the value added in the step S2407 is larger than usage status change work total time calculated till then (a step S2408) and when the usage status change work time calculating unit determines that the value added in the step S2407 is larger than the usage status change work total time (the step S2408; Yes), the value added in the step S2407 is set in the usage status change work total time (a step S2409). Afterward, control is returned to the step S2403 and each processing in the steps S2403 to S2409 is repeated.

In the meantime, when the usage status change work time calculating unit 117 determines that the value added in the step S2407 is not larger than the usage status change work total time (the step S2408; No), control is returned to the step S2403 without processing and each processing in the steps S2403 to S2409 is repeated. As described above, the usage status change work time estimated value 1103 is added every the usage status change work resource name 1104 included in the record in the usage status change work candidate list 115 shown in FIG. 11 and a maximum value is set as usage status change work total time. Next, control is returned to FIG. 15 and each processing after the step S1506 will be described.

When the usage status change work time calculating unit 117 calculates usage status change work total time, the concession plan preparing unit 105 determines whether or not time at which the concession source user restarts the use of the resource passes when the usage status change work total time and the period 304 included in the authority cession requirement list 107 elapse since current time, that is, whether or not the period 304 specified by the concession source user to concede the resource and included in the authority cession requirement list 107 is reserved (the step S1506).

When the concession plan preparing unit 105 determines that the period 304 included in the authority cession requirement list 107 is reserved (the step S1506; Yes), it adds adaptable resource capacity (for example, a value, 0.6 GB of "memory freed capacity" which the usage status change work time calculating unit 117 calculates) to the reserved resource capacity 1004 in the concession source/concession destination candidate list 114 shown in FIG. 10, sets the usage status change work contents 605 (for example, "freeing memory") in the conceding method 1008 in the concession source/concession destination candidate list shown in FIG. 10 (a step S1507), and determines whether or not the added reserved resource capacity 1004 is equal to or exceeds the concession destination resource capacity 1003 (a step S1508).

In this case, in the step S1506, the double time of usage status change work total time is calculated based upon current time and when the calculated time and the period 304 included in the authority cession requirement list 107 elapse, it may be also determined whether or not the time at which the concession source user restarts the use of the resource passes. That is, it is estimated that work time for shifting from a current usage status to a usage status of the concession destination and work time for returning from the usage status of the concession destination to the current usage status are equal and it may be also determined whether or not respective work time can be reserved.

Besides, in the step S1503, the concession plan preparing unit 105 may also calculate usage status change work total time also including work time for returning from the usage status of the concession destination to the current usage status by replacing the concession source usage status 1006 and the concession destination usage status 1002 and also adding the retrieved usage status change work candidate in the usage status change work candidate list.

When the concession plan preparing unit 105 determines that the reserved resource capacity 1004 after addition is equal to or exceeds the concession destination resource capacity 1003 (the step S1508, Yes), it prepares a concession plan information list 2301 (a step S1509).

FIG. 20 shows an example of the concession plan information list 2301. As shown in FIG. 20, the concession plan information list 2301 includes a concession plan number 2302, a reservation request number 2303, a user name 2304 and concession contents 2305.

The concession plan number 2302 is identification information for uniquely identifying a concession plan. The reservation request number 2303 is identical with the reservation request number 201 included in the reservation request 133 shown in FIG. 2. The user name 2304 is a destination of the transmission of the concession plan information list 2301 and includes names of the concession source user and the concession destination user.

The concession contents 2305 includes the concrete contents of the concession plan. The example shown in FIG. 20 includes the start time 203, 2009/xx/xx included in the reservation request 133 shown in FIG. 2, the concession source user name 1005, User1 and the concession destination user name 1001, User2 respectively included in the concession source/concession destination candidate list 114 shown in FIG. 10 and the restart time, 2009/yy/yy included in the authority cession requirement 307 in the authority cession requirement list 107 shown in FIG. 3.

When the concession plan preparing unit 105 prepares the concession plan, control is returned to the step S1502, processing in the steps S1502 to S1509 is repeated, and when the concession plan preparing unit determines that all records in the concession source/concession destination candidate list 114 are retrieved in the step S1502 (the step S1502; Yes), it terminates the concession plan preparing process. Next, returning to FIG. 13, each processing after the step S1304 will be described.

Afterward, the concession managing unit 106 determines whether or not a concession plan prepared by the concession plan preparing unit 105 exists (the step S1304), when the concession managing unit determines that the concession plan exists (the step S1304; Yes), it selects the prepared concession plan (the step S1305), and the concession managing unit transmits a consent request for getting the concession source user and the concession destination user to permit the concession of the resource according to the concession plan (the step S1306).

After the concession managing unit 106 transmits the consent request, it determines whether or not a response is received (the step S1307), when the concession managing unit determines that no response is received (the step S1307; No), control is returned to the step S1304, and each processing after the step S1304 is repeated.

In the meantime, when the concession managing unit 106 determines that the response is received (the step S1307; Yes), it makes the concession of the resource started according to the concession plan prepared in the step S1303 (the step S1308). In the step S1304, when the concession managing unit 106 determines that no concession plan prepared by the concession plan preparing unit 105 exists (the step S1304; No), it terminates the concession plan preparing process shown in FIG. 13.

As described above, the resource can be securely conceded because the event receiving unit 104 receives the reservation request 133 at least including the period 204 in which the resource is used, the usage status 205 showing environment in which the resource is used and the authority cession requirement 207 showing whether or not the concession of the resource from the concession source user to the concession destination user is possible from the concession source user and the concession destination user, the usage status change work process list 110 stores the pre-cession usage status which is a usage status of the resource on the side of the concession source user, the post-cession usage status which is a usage status of the resource on the side of the concession destination user and the condition 603 for calculating usage status change work time for shifting from the pre-cession usage status to the post-cession usage status with them correlated, the usage status change work time arithmetic expression list 109 stores the usage status change work time arithmetic expression 503 of work time with the work time correlated with the condition 603, the concession plan preparing unit 105 determines whether or not the concession of the resource is written to the authority cession requirement 207 in the reservation request 133 received from the concession source user, when the concession plan preparing unit determines that the concession of the resource is written to the authority cession requirement 207 in the reservation request 133 received from the concession source user, it specifies the pre-cession usage status matched with the usage status 205 included in the reservation request 133 received from the concession source user and the post-cession usage status matched with the usage status 205 included in the reservation request 133 received from the concession destination user, the concession plan preparing unit calculates usage status change work time based upon the condition 603 corresponding to the pre-cession usage status and the post-cession usage status respectively specified and the usage status change work time arithmetic expression 503 corresponding to the condition 603, the concession plan preparing unit calculates available resource capacity conceded to the concession destination user by the concession source user based upon the calculated usage status change work time, the period 204 included in the reservation request 133 from the concession source user and the period 204 included in the reservation request 133 from the concession destination user and the concession managing unit 106 makes the concession source user concede the concession destination user with the resource having capacity calculated by the concession plan preparing unit 105.

Figure 21:
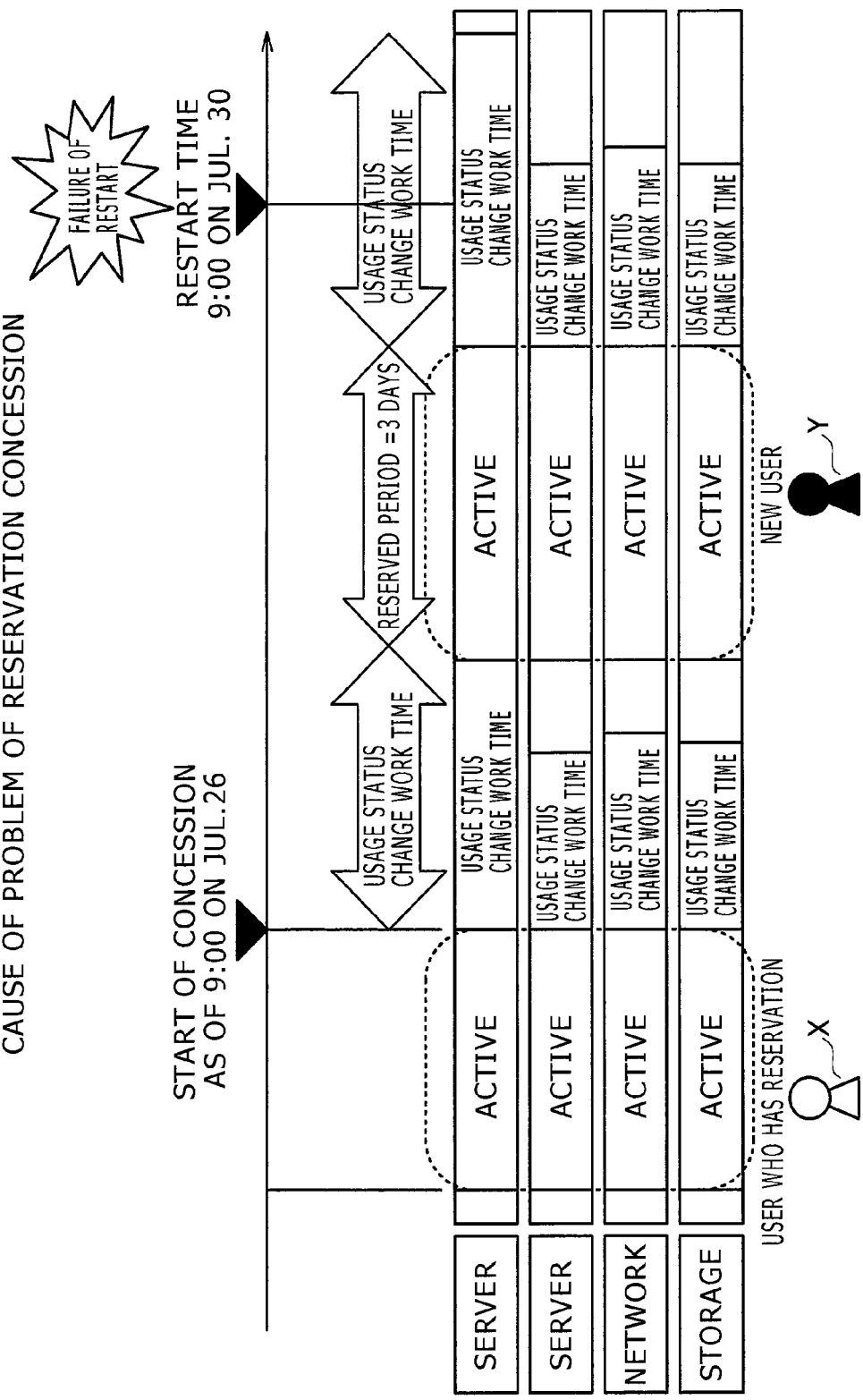
FIG. 21 shows circumstances when time at which a concession source user restarts a resource cannot be guaranteed.

For example, the concession destination user is prevented from using the resource past restart time which the concession source user specifies (the concession source user can be guaranteed the restart time of the resource). FIG. 21 shows a case that the concession source user cannot be guaranteed the restart time of the resource. A problem shown in FIG. 21 that though the concession source user X specifies 2009/7/30/9:00 as restart time, the concession source user X cannot use the resource at the restart time when time at which concession is to be started is 2009/7/26/9:00 in a case that a period in which the concession destination user Y uses the resource is three days and usage status change work requires one day or more is settled. That is, a request specified by the concession source user and a request specified by the concession destination user can be both met and the resource can be conceded.

Second Embodiment

In the above-mentioned first embodiment, the concession plan information list 2301 of an adaptable resource is prepared by calculating usage status change work time and the resource can be securely conceded. However, usage status change work time may vary depending upon the capacity of the resource and a usage status of the resource respectively specified in the reservation request 133 by the concession source user. Then, in this embodiment, a case that after a concession plan is prepared, a method of calculating usage status change work time calculated in a process in which the concession plan is prepared is varied according to a measured result described later of usage status change work time so as to enhance the precision of calculating usage status change work time will be described.

Figure 22:
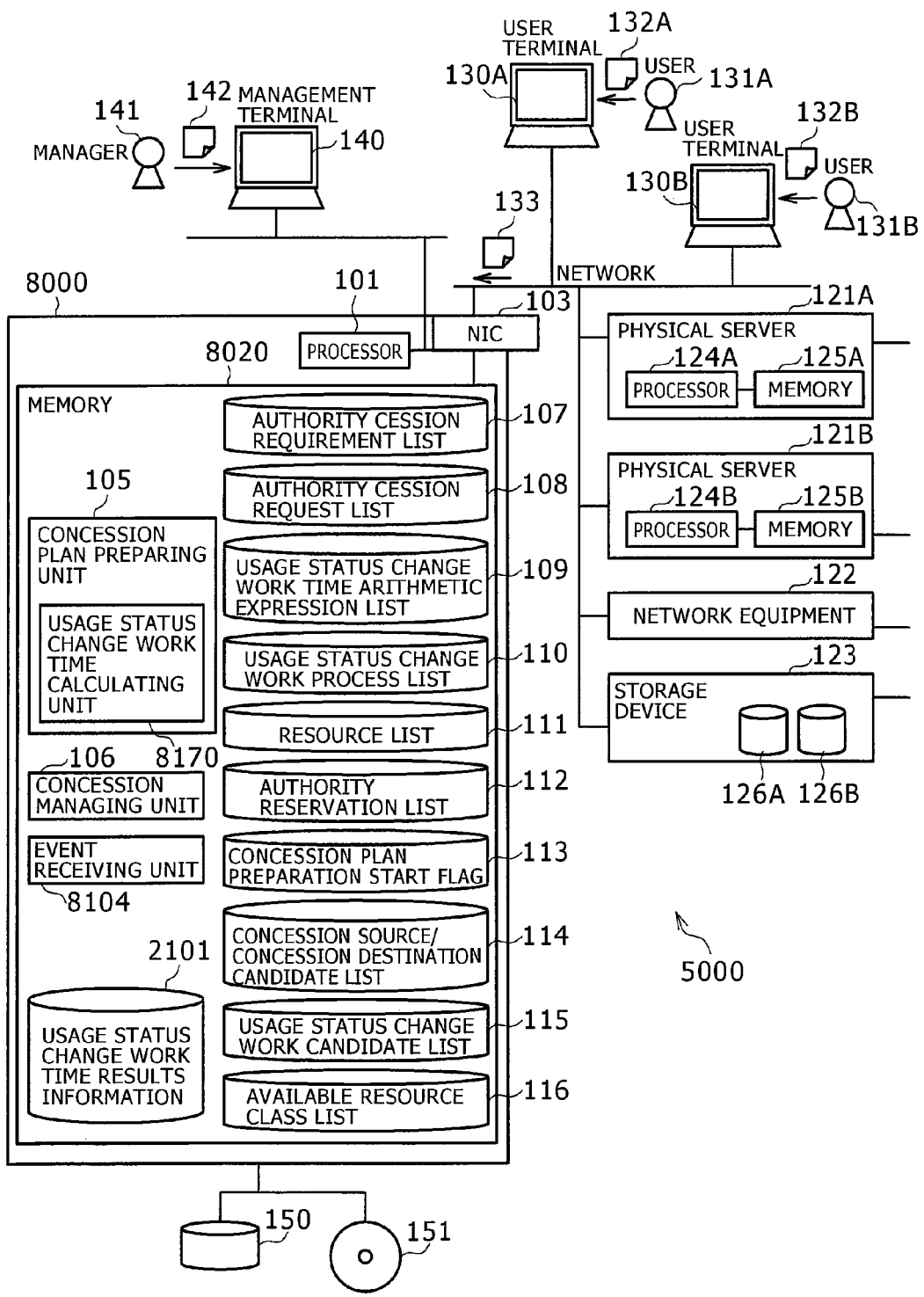
FIG. 22 is a block diagram showing the configuration of a resource scheduling system in a second embodiment.

FIG. 22 is a block diagram showing the configuration of a resource scheduling system 5000 in the second embodiment. As shown in FIG. 22, PC 8000 is different from the PC 100 in the first embodiment in that the PC 8000 is provided with memory usage status change work time results information 2101, an event receiving unit 8104 different from the event receiving unit 104 in the first embodiment and a usage status change work time calculating unit 8170 different from the usage status change work time calculating unit 117 in the first embodiment. The same reference number is allocated to the same component as that of the PC 100 in the first embodiment and the description is omitted.

The event receiving unit 8104 receives usage status change work time results information 2101 described later from a server 121 and others with which the resource scheduling system 5000 is provided in addition to executing the similar process to the event receiving unit 104 in the first embodiment.

The usage status change work time calculating unit 8170 executes a usage status change work time arithmetic expression list updating process in addition to executing the similar process to the usage status change work time calculating unit 117 in the first embodiment. The concrete contents of the usage status change work time arithmetic expression list updating process will be described later.

In a field of the usage status change work time results information 2101, the past results of usage status change work time when the resource scheduling system 1000 makes resources such as the servers 121A, 121B, the network equipment 122 and the storage device 123 respectively shown in FIG. 1 conceded are stored. The contents of the following each item of the usage status change work time results information 2101 are preset according to past results by a manager 141 and others.

FIG. 23 shows an example of the usage status change work time results information 2101. As shown in FIG. 23, the usage status change work time results information 2101 includes a usage status change work executor 2102, usage status change work contents 2103 and a usage status change work time resultant value 2104. The concrete contents of these will be described when the usage status change work time arithmetic expression list updating process is described later.

Figure 24:
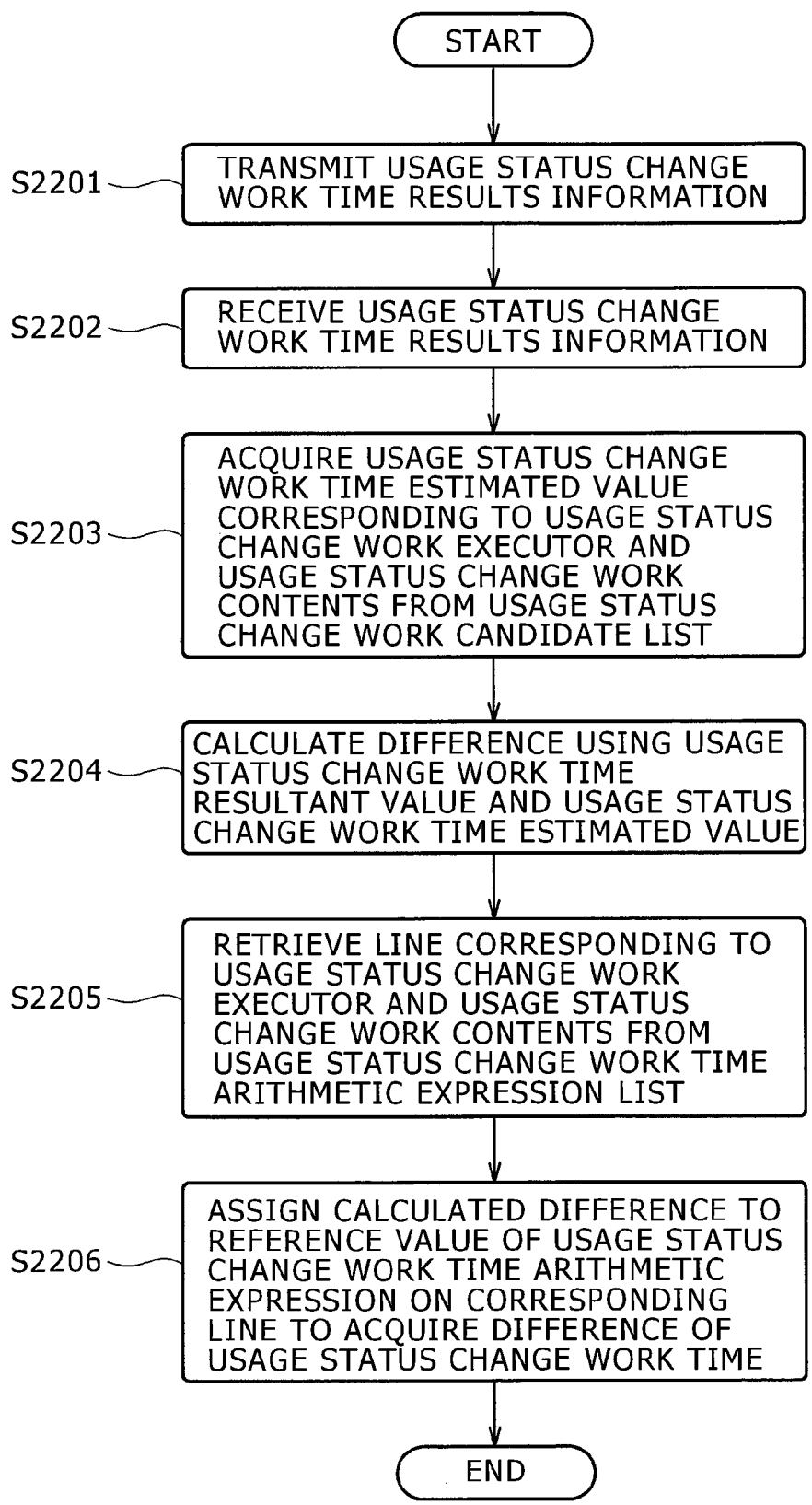
FIG. 24 is a flowchart showing a procedure of a usage status change work time arithmetic expression list updating process.

FIG. 24 is a flowchart showing a procedure of the usage status change work time arithmetic expression list updating process. As shown in FIG. 24, a server 121 and others with which the resource scheduling system 5000 is provided transmit the usage status change work time results information 2101 to the PC 8000 (a step S2201). A processor 124A and others regularly transmit the usage status change work time results information 2101 according to a timer not shown for example.

Afterward, the event receiving unit 8104 of the PC 8000 receives the usage status change work time results information 2101 (a step S2202) and the usage status change work time calculating unit 8170 refers to the usage status change work executor 2102, the usage status change work contents 2103 and the usage status change work time resultant value 2104 respectively included in the usage status change work time results information 2101 received by the event receiving unit 8104.

Plural records are included in the usage status change work time results information 2101 shown in FIG. 23, however, a case that the usage status change work executor 2102 is a virtual server and the usage status change work contents 2103 are "freeing memory" will be described below, and a case that the usage status change work time resultant value 2104 is 8 min. will be described below.

Afterward, the usage status change work time calculating unit 8170 acquires the usage status change work time estimated value 1103 corresponding to the usage status change work executor 2102 and the usage status change work contents 2103 respectively received in the step S2022, referring to the usage status change work candidate list 115 shown in FIG. 11 (a step S2203).

The usage status change work time calculating unit 8170 calculates difference between the usage status change work time resultant value 2104 received in the step S2202 and the usage status change work time estimated value 1103 acquired in the step S2203 using the values (a step S2204). For example, the difference, 6.8 min. between the usage status change work time resultant value 2104, 8 min. shown in FIG. 23 and the usage status change work time estimated value 1103, 1.2 min. shown in FIG. 11 is acquired. In the following description, the difference between these values is calculated, however, for example, the usage status change work time estimated value 1103 may be also corrected to be the usage status change work time resultant value 2104 by calculating the ratio of these values.

Afterward, the usage status change work time calculating unit 8170 retrieves a record corresponding to the usage status change work executor 2102 and the usage status change work contents 2103 respectively received in the step S2202, referring to the usage status change work time arithmetic expression list 109 shown in FIG. 5 (a step S2205).

For example, when the usage status change work time results information 2101 shown in FIG. 23 is received, a record in which the usage status change work executor 501 is a virtual server and the usage status change work contents 502 is "freeing memory" is retrieved from the usage status change work time arithmetic expression list 109.

The usage status change work time calculating unit 8170 assigns the difference calculated in the step S2204 in the usage status change work time arithmetic expression 503 included in the retrieved record and acquires the difference of usage status change work time (a step S2206).

When processing in the step S2206 is finished, all processing in the usage status change work time arithmetic expression list updating process shown in FIG. 22 is finished. The manager 141 and others can modify the usage status change work time arithmetic expression 503 which functions as a basis of calculating the usage status change work time estimated value 1103 to approach more accurate usage status change work time by referring to the difference calculated as described above of the usage status change work time.

As described above, as the event receiving unit 8104 further receives the usage status change work time results information 2101 showing the actual results of usage status change work time from an external device and a concession plan preparing unit 105 (the usage status change work time calculating unit 8170) calculates the different between the calculated usage status change work time and the usage status change work results information 2101 received by the event receiving unit 8104, the precision of calculating the usage status change work time is enhanced and resources can be more securely conceded.

In the first or second embodiments, when the concession plan preparing unit 105 prepares the concession plan information list 2301, the concession managing unit 106 transmits the concession plan information list 2301 to the concession source user and the concession destination user. However, there are also a case that a concession source user and a concession destination user who receive a concession plan information list 2301 forget a response to a consent request and a case that work for preparation is required to be performed by the concession source user or the concession destination user. Then, a case that a concession managing unit 106 transmits the concession plan information list 2301 after calculating an expiration date showing a time limit of a response to the consent request and adding the calculated expiration date to the concession plan information list 2301 prepared by the concession plan preparing unit 105 will be described below.

In this case, when the concession destination user is actually conceded with the resource, the concession destination user can confirm when he/she is required to finish preparation work such as the backup of a system under control for example beforehand. Accordingly, the preparation work of the concession destination user can be prevented from coming to nothing such as being late for the timing of concession. Similarly, the concession source user can also confirm when he/she is required to finish preparation work such as the backup of a system being operated before concession beforehand.

For example, in a case that the concession plan preparing unit 105 determines whether or not time at which the concession source user is to restart the use of the resource passes in the step S1506 of the concession plan preparing process shown in FIG. 15 when the usage status change work total time and the period 304 included in the authority cession requirement list 107 elapse from current time, the concession managing unit 106 further calculates time by subtracting a preset preparatory period from time till the period 304 included in the authority cession requirement list 107 shown in FIG. 3 in the step S1307 of the concession plan preparing/applying process shown in FIG. 13 after usage status change work total time elapses from the current time and sets the calculated time in the concession plan list as a term of validity.

FIG. 25 shows an example of a concession plan list 8301 set as described above. As shown in FIG. 25, time, 2009/xx/zz (ww>zz) which is prior to time, 2009/xx/ww included in concession contents 2305 is set in the concession plan list 8301 as an expiration date 8306 of a response.

When the concession managing unit 106 receives no response to a consent request until time shown in a field of the expiration date 8306 of the response passes, it deletes a concession plan equivalent to a concession plan number 2301 included in the concession plan list 8301 from the concession source/concession destination candidate list 114 shown in FIG. 10. In this case, the concession managing unit 106 may also instantly delete the concession plan equivalent to the concession plan number 2301 included in the concession plan list 8301 from the concession source/concession destination candidate list 114 shown in FIG. 10 when the concession managing unit receives a response notifying rejection for the consent request until the time shown in the field of the expiration date 8306 of the response passes.

A response notifying rejection for a consent request may also have a layout like concession consent response information 2401 including a concession plan number 2402, a user name 2403 and consent to concession 2404 as shown in FIG. 26 for example. Each value in the reference numerals 2302, 2304 included in the concession plan list 8301 shown in FIG. 25 is set in each item shown by the reference numerals 2402, 2403.

As described above, as the concession managing unit 106 determines whether or not usage status change work time calculated by the concession plan preparing unit 105 is in the period 204 included in a reservation request 133 from the concession source user from current time when the concession managing unit acquires consent to the concession of the resource, when the concession managing unit determines that the usage status change work time calculated by the concession plan preparing unit 105 is in the period 204 included in the reservation request 133 from the concession source user from the current time, it calculates a differential period between the period 204 included in the reservation request 133 from the concession source user and time acquired by adding the usage status change work time to the current time and transmits a term of validity which is a period until the differential period elapses from the current time, the resource can be securely conceded even if preparatory work to be performed before the concession destination user is conceded is required.

A program executed in the PC 100 and the PC 8000 in these embodiments is provided in a file according to an installable format or an executable format with the program recorded on a record medium readable by the computer such as CD-ROM, a flexible disk (FD), CD-R and a digital versatile disk (DVD).

Besides, the above-mentioned program is stored in a computer connected to a network such as the Internet and may be also provided by downloading via the network. Further, the above-mentioned program may be also provided or distributed via a network such as the Internet. Furthermore, the program in this embodiment may be also provided with the program built in ROM and others beforehand.

The present invention is not limited to the above-mentioned embodiments and a component can be transformed and embodied in a range in which the present invention does not deviate from its object. Besides, various inventions can be made by suitably combining plural components disclosed in the above-mentioned embodiments. For example, some components may be deleted from all components in the embodiments. Further, components in different embodiments may be also suitably combined.

What is claimed is:

1. An information processor, comprising:
   a receiving unit that receives a request at least including a period in which a resource is used, a usage status showing environment in which the resource is used and a cession requirement showing whether or not the cession of the resource from a concession source user to a concession destination user is possible from the concession source user and the concession destination user;
   a work process storage that stores a pre-cession usage status which is a usage status of the resource of the concession source user, a post-cession usage status which is a usage status of the resource of the concession destination user and a calculating condition for calculating work time for shifting from the pre-cession usage status to the post-cession usage status with them correlated;
   a work time arithmetic expression storage that stores an arithmetic expression of the work time with the work time correlated with the calculating condition;
   a concession plan preparing unit that determines whether or not the concession of the resource is written to the cession requirement in the request received from the concession source user is not, specifies the pre-cession usage status identical with the usage status included in the request received from the concession source user and the post-cession usage status identical with the usage status included in the request received from the concession destination user when the concession plan preparing unit determines that it is written to the cession requirement in the request received from the concession source user that the resource is conceded, calculates the work time based upon the calculating condition and the arithmetic expression corresponding to the calculating condition respectively corresponding to the specified used before concession and the specified post-cession usage status, and calculates the capacity of the available resource with which the concession destination user is conceded from the concession source user based upon the calculated work time, the usage period included in the request from the concession source user and the usage period included in the request from the concession destination user; and
   a concession managing unit that makes the resource of the capacity which the concession plan preparing unit calculates conceded from the concession source user to the concession destination user.

2. The information processor according to claim 1, wherein the receiving unit further receives the request including the capacity of the resource which the concession destination user requires from the concession destination user, determines whether or not the capacity of the resource conceded from the concession source user meets the capacity of the resource which the concession destination user requires, and sets the concession destination user as a new concession source user only when the receiving unit determines that it is written to the cession requirement in the request received from the concession destination user that the resource is conceded in a case that the receiving unit determines that the capacity of the resource conceded from the concession source user meets the capacity of the resource required by the concession destination user.

3. The information processor according to claim 2, wherein when the receiving unit determines that the capacity of the resource conceded from the concession source user does not meet the capacity of the resource which the concession destination user requires, it sets the concession destination user as an enqueued concession destination user that waits for the concession of the resource from the concession source user or the new concession source user.

4. The information processor according to claim 3, wherein the concession plan preparing unit determines whether or not the usage period included in the request from the new concession source user set by the receiving unit and the usage period included in the request from the enqueued concession destination user respectively set by the receiving unit are overlapped, and when the concession plan preparing unit determines that the usage period included in the request from the new concession source user and the usage period included in the request from the enqueued concession destination user are not overlapped, it sets the enqueued concession destination user.

5. The information processor according to claim 4,
   wherein the work process storage further stores a plurality of work contents for shifting from the pre-cession usage status to the post-cession usage status with the work contents correlated with the pre-cession usage status, the post-cession usage status and the calculating condition; and
   the concession plan preparing unit calculates the work time by specifying the work content for shifting from the usage status included in the request from the enqueued concession destination user to the usage status included in the request from the new concession source user out of the plurality of work contents, calculating work time for every specified work content based upon the pre-cession usage status, the post-cession usage status and the arithmetic expression corresponding to the calculating condition corresponding to the specified work content, and accumulating the calculated work time.

6. The information processor according to claim 5,
   wherein the work process storage further stores the work content and a unit resource which is a unit of the resource with which the concession destination user is conceded with them correlated; and
   the concession plan preparing unit calculates the work time for the every unit resource by calculating unit resource work time acquired by accumulating the calculated work time for the every unit resource.

7. The information processor according to claim 6, wherein the concession plan preparing unit sets the longest unit resource work time as the work time when it calculates the unit resource work time.

8. The information processor according to claim 1,
   wherein the receiving unit further receives resultant work time showing a result of the work time from an external device; and
   the concession plan preparing unit calculates a difference between the calculated work time and the resultant work time received by the receiving unit.

9. The information processor according to claim 1, wherein the concession managing unit transmits a request for consent to the concession of the resource to the concession destination user to the concession source user when the resource is conceded from the concession source user to the concession destination user.

10. The information processor according to claim 9, wherein the concession managing unit requests consent to the concession of the resource and determines whether or not the work time calculated by the concession plan preparing unit is in the usage period included in the request from the concession source user from current time, calculates a differential period between the usage period included in the request from the concession source user and time acquired by adding the work time to the current time when the concession managing unit determines that the work time calculated by the concession plan preparing unit is in the usage period included in the request from the concession source user from the current time, and transmits a term of validity which is a period in which the differential period elapses from the current time.

11. A resource scheduling method executed in an information processor provided with a work process storage that stores a pre-cession usage status that is a condition in which a concession source user uses a resource, a post-cession usage status that is a condition in which a concession destination user uses the resource and a calculating condition for calculating work time for shifting from the pre-cession usage status to the post-cession usage status with them correlated and a work time arithmetic expression storage that stores an arithmetic expression of the work time with the arithmetic expression correlated with the calculating condition, comprising:

a receiving step for receiving a request at least including a usage period of the resource, a usage status showing environment in which the resource is used and a cession requirement showing whether or not the concession of the resource from the concession source user to the concession destination user is possible from the concession source user and the concession destination user;

a concession plan preparing step for determining whether or not it is written to the cession requirement in the request received from the concession source user that the resource is conceded, specifying the pre-cession usage status identical with the usage status included in the request received from the concession source user and the post-cession usage status identical with the usage status included in the request received from the concession destination user when it is determined that it is written to the cession requirement in the request received from the concession source user that the resource is conceded, calculating the work time based upon the calculating condition corresponding to the specified pre-cession usage status and the specified post-cession usage status and the arithmetic expression corresponding to the calculating condition, and calculating the capacity of the available resource with which the concession destination user is conceded from the concession source user based upon the calculated work time, the usage period included in the request from the concession source user and the usage period included in the request from the concession destination user; and a concession managing step for making the resource of the capacity calculated in the concession plan preparing step conceded from the concession source user to the concession destination user.

12. The resource scheduling method according to claim 11, wherein in the receiving step, the request including the capacity of the resource required by the concession destination user is further received from the concession destination user, it is determined whether or not the capacity of the resource conceded from the concession source user meets the capacity of the resource required by the concession destination user, and the concession destination user is set as a new concession source user only when it is determined that it is written to the cession requirement in the request received from the concession destination user that the resource is conceded in a case that it is determined that the capacity of the resource conceded from the concession source user meets the capacity of the resource required by the concession destination user.

13. The resource scheduling method according to claim 12, wherein in the receiving step, when it is determined that the capacity of the resource conceded from the concession source user does not meet the capacity of the resource required by the concession destination user, the concession destination user is set as an enqueued concession destination user that waits for the concession of the resource from the concession source user or the new concession source user.

14. The resource scheduling method according to claim 13, wherein in the concession plan preparing step, it is determined whether or not the usage period included in the request from the new concession source user and the usage period included in the request from the enqueued concession destination user respectively set in the receiving step are overlapped, and when it is determined that the usage period included in the request from the new concession source user and the usage period included in the request from the enqueued concession destination user are not overlapped, the enqueued concession destination user is set.

15. The resource scheduling method according to claim 14, wherein a plurality of work contents for shifting from the pre-cession usage status to the post-cession usage status are further stored in the work process storage with the pre-cession usage status, the post-cession usage status and the calculating condition correlated; and in the concession plan preparing step, the work content for shifting from the usage status included in the request from the enqueued concession destination user to the usage status included in the request from the new concession source user is specified out of the plurality of work contents, work time for every specified work content is calculated based upon the pre-cession usage status, the post-cession usage status and the arithmetic expression corresponding to the calculating condition corresponding to the specified work content, and the work time is calculated by accumulating the calculated work time.

16. The resource scheduling method according to claim 15, wherein the work content and a unit resource which is a unit of the resource with which the concession destination user is conceded are further stored in the work process storage with the work content and the unit resource correlated; and in the concession plan preparing step, the work time for the every unit resource is calculated by calculating unit resource work time by accumulating the calculated work time for the every unit resource.

17. The resource scheduling method according to claim 16, wherein in the concession plan preparing step, when the unit resource work time is calculated, the longest unit resource work time is set as the work time.

18. The resource scheduling method according to claim 11, wherein in the receiving step, resultant work time showing a result of the work time is further received from an external device; and in the concession plan preparing step, a difference between the calculated work time and the resultant work time received in the receiving step is calculated.

19. The resource scheduling method according to claim 11, wherein in the concession managing step, when the resource is conceded from the concession source user to the concession destination user, a request for consent to the concession of the resource to the concession destination user is transmitted to the concession source user.

20. The resource scheduling method according to claim 19, wherein in the concession managing step, a request for consent to the concession of the resource is transmitted, it is determined whether or not the work time calculated in the concession plan preparing step is in the usage period included in the request from the concession source user from current time, when it is determined that the work time calculated in the concession plan preparing step is in the usage period included in the request from the concession source user from the current time, a differential period between the usage period included in the request from the concession source user and time acquired by adding the work time to the current time is calculated, and a term of validity which is a period until the differential period elapses from the current time is transmitted.

\* \* \* \* \*